(12) United States Patent
Suarez et al.

(10) Patent No.: US 12,095,784 B2
(45) Date of Patent: Sep. 17, 2024

(54) METHODS AND SYSTEMS FOR INDICATING THE POSSIBILITY OF A CYBER-ATTACK ON A COMPUTER NETWORK

(71) Applicant: Lloyds Banking Group PLC, Edinburgh (GB)

(72) Inventors: Miguel Merayo Suarez, Edinburgh (GB); Alexander Wallace, Edinburgh (GB); James Bell, Edinburgh (GB)

(73) Assignee: Lloyds Banking Group PLC, Edinburgh (GB)

( * ) Notice: Subject to any disclaimer, the term of this patent is extended or adjusted under 35 U.S.C. 154(b) by 0 days.

(21) Appl. No.: 18/425,906

(22) Filed: Jan. 29, 2024

(65) Prior Publication Data

US 2024/0259401 A1    Aug. 1, 2024

(30) Foreign Application Priority Data

Jan. 30, 2023    (GB) ...................................... 2301311

(51) Int. Cl.
    *H04L 9/40*    (2022.01)
(52) U.S. Cl.
    CPC ...... *H04L 63/1416* (2013.01); *H04L 63/1425* (2013.01)
(58) Field of Classification Search
    CPC ............. H04L 63/1416; H04L 63/1425; H04L 63/1433; H04L 63/1441; H04L 63/1408; H04L 63/14

(Continued)

(56) References Cited

U.S. PATENT DOCUMENTS 8,555,357 B1 * 10/2013 Gauvin ............... H04L 63/1441
                                                                726/6
9,654,485 B1 * 5/2017 Neumann ........... H04L 63/1416
(Continued)

OTHER PUBLICATIONS

Al-Shaer et al, "Learning the Associations of MITRE ATT&CK Adversarial Techniques", Conference on Communications and Network Security, 2020, 9 pages.

(Continued)

*Primary Examiner* — Dant B Shaifer Harriman
*Assistant Examiner* — Mahabub S Ahmed
(74) *Attorney, Agent, or Firm* — Dority & Manning, P.A.

(57) ABSTRACT

A computer-implemented method for indicating the possibility of a cyber-attack on a computer network, comprising: receiving, from one or more security components installed in a network, an indication of activity within the network associated with a security threat; mapping the indication of activity to one or more cyber-attack techniques; identifying one or more previously received indications of activity within the network associated with a security threat; identifying one or more cyber-attack techniques to which the previously received indication(s) of activity have been mapped; determining whether the indication of activity is associated with one or more of the previously received indication(s) of activity, the determination based at least in part on a strength of a relationship between the one or more cyber-attack techniques to which the indication of activity is mapped and the one or more cyber-attack techniques to which the previously received indication(s) of activity have been mapped; and dependent on the indication of activity being determined to be associated with a previously received indication of activity, issuing a security alert.

18 Claims, 23 Drawing Sheets

(58) Field of Classification Search
USPC .................................................. 726/22–25
See application file for complete search history.

(56) References Cited

U.S. PATENT DOCUMENTS

| | | | | |
|---|---|---|---|---|
| 9,773,112 | B1* | 9/2017 | Rathor | G06F 21/554 |
| 10,027,689 | B1* | 7/2018 | Rathor | H04L 63/1416 |
| 10,033,753 | B1* | 7/2018 | Islam | H04L 63/1416 |
| 10,237,294 | B1* | 3/2019 | Zadeh | H04L 61/45 |
| 10,515,366 | B1* | 12/2019 | Gorelik | G06Q 20/4016 |
| 10,673,880 | B1* | 6/2020 | Pratt | H04L 63/1425 |
| 11,228,604 | B2* | 1/2022 | Mistry | H04L 63/1441 |
| 11,252,188 | B1* | 2/2022 | Lantuh | H04L 63/20 |
| 11,463,299 | B2* | 10/2022 | Wu | G06F 16/958 |
| 11,475,053 | B1* | 10/2022 | Das | G06F 16/3344 |
| 11,483,319 | B2* | 10/2022 | Okunlola | H04L 63/1433 |
| 11,863,526 | B2* | 1/2024 | Kaidi | H04L 63/0236 |
| 11,892,897 | B2* | 2/2024 | Shakarian | G06F 18/2148 |
| 11,924,239 | B2* | 3/2024 | Ngweta | H04L 63/1408 |
| 11,924,244 | B2* | 3/2024 | Lantuh | H04L 63/029 |
| 2005/0160286 | A1* | 7/2005 | Currie | G06F 21/577 726/22 |
| 2006/0212486 | A1* | 9/2006 | Kennis | G06F 21/55 |
| 2009/0241173 | A1* | 9/2009 | Troyansky | G06F 21/6218 726/5 |
| 2010/0031041 | A1* | 2/2010 | Cohen | H04L 9/3263 713/168 |
| 2012/0143650 | A1* | 6/2012 | Crowley | G06Q 10/0635 726/25 |
| 2013/0312092 | A1* | 11/2013 | Parker | H04L 63/1408 726/22 |
| 2015/0244681 | A1* | 8/2015 | Blumenfeld | H04L 9/30 713/168 |
| 2015/0264084 | A1* | 9/2015 | Kashyap | H04L 63/1483 726/22 |
| 2016/0205126 | A1* | 7/2016 | Boyer | H04L 63/1433 726/25 |
| 2017/0063905 | A1* | 3/2017 | Muddu | G06N 5/022 |
| 2017/0289199 | A1* | 10/2017 | Barday | G06F 3/04817 |
| 2018/0004948 | A1* | 1/2018 | Martin | H04L 63/1425 |
| 2018/0091530 | A1* | 3/2018 | Rook | H04L 63/1416 |
| 2018/0183827 | A1* | 6/2018 | Zorlular | H04L 63/1416 |
| 2018/0191577 | A1* | 7/2018 | Herczog | H04L 41/14 |
| 2019/0104141 | A1* | 4/2019 | Avraham | H04L 63/1441 |
| 2019/0132343 | A1* | 5/2019 | Chen | G06N 3/045 |
| 2019/0253439 | A1* | 8/2019 | Payton | H04L 69/08 |
| 2019/0311121 | A1 | 10/2019 | Martin et al. | |
| 2019/0377819 | A1* | 12/2019 | Filliben | G06N 3/084 |
| 2019/0378010 | A1* | 12/2019 | Morris | G06F 16/288 |
| 2020/0057850 | A1* | 2/2020 | Kraus | G06F 21/552 |
| 2020/0104402 | A1* | 4/2020 | Burnett | G06F 16/288 |
| 2020/0177618 | A1* | 6/2020 | Hassanzadeh | G06F 21/552 |
| 2020/0358817 | A1* | 11/2020 | Ahluwalia | H04L 61/5046 |
| 2021/0029144 | A1* | 1/2021 | Merza | H04L 63/1416 |
| 2021/0081539 | A1* | 3/2021 | Karin | G06F 21/577 |
| 2021/0126938 | A1* | 4/2021 | Trost | G06F 21/552 |
| 2021/0273970 | A1* | 9/2021 | Alshech | H04L 63/1433 |
| 2021/0281585 | A1* | 9/2021 | Warikoo | H04L 63/1408 |
| 2021/0367961 | A1* | 11/2021 | Kuppa | G06F 40/205 |
| 2022/0053016 | A1 | 2/2022 | Trost et al. | |
| 2022/0159033 | A1* | 5/2022 | Mizrahi | H04L 63/1441 |
| 2022/0232031 | A1* | 7/2022 | Bogren | H04L 63/102 |
| 2023/0096596 | A1* | 3/2023 | Cohen | G06Q 40/12 726/23 |
| 2023/0101995 | A1* | 3/2023 | Castrejon, III | H04W 12/122 726/22 |
| 2023/0114821 | A1* | 4/2023 | Thomas | H04L 63/20 726/23 |
| 2023/0216967 | A1* | 7/2023 | Murali | H04M 15/00 455/406 |
| 2023/0224324 | A1* | 7/2023 | Karabey | H04L 63/1416 726/23 |
| 2023/0252134 | A1* | 8/2023 | Gui | G06F 21/552 726/23 |
| 2023/0252136 | A1* | 8/2023 | Kim | G06F 21/566 726/22 |
| 2023/0259632 | A1* | 8/2023 | Marciano | G06F 21/577 726/25 |
| 2023/0289444 | A1* | 9/2023 | Ermey | G06F 21/552 |
| 2023/0291755 | A1* | 9/2023 | Siebel | G06N 20/00 |
| 2023/0319089 | A1* | 10/2023 | Chesla | H04L 63/1425 726/23 |
| 2023/0325511 | A1* | 10/2023 | Jaster | G06F 21/577 726/23 |
| 2024/0039953 | A1* | 2/2024 | Cho | H04L 63/1458 |
| 2024/0054210 | A1* | 2/2024 | Kim | G06F 21/54 |
| 2024/0098105 | A1* | 3/2024 | Kanady | H04L 63/1416 |

OTHER PUBLICATIONS

PCT International Search Report and Written Opinion for corresponding Application No. PCT/GB2024/050236, dated Mar. 20, 2024, 15 pages.

Florian Wilkens et al., "Methods for Enhanced Security Monitoring and APT Detection in Enterprise Networks", Dissertation, Universität Hamburg, URL https://ediss.sub.uni-hamburg.de/bitstream/ediss/10398/2/Dissertation_Florian-Wilkens.pdf, submitted on Nov. 15, 2022, 211 pages.

Al-Shaer et al., "Learning the Associations of MITRE ATT&CK Adversarial Techniques", 2020 IEEE Conference on Communications and Network Security (CNS), published 2020, IEEE, pp. 1-9, sections I, IV, and VII.

* cited by examiner

| Alert | Techniques | | | | | | |
|---|---|---|---|---|---|---|---|
| | T1 | T2 | T3 | T4 | T5 | T6 | T7 |
| A1 | ✓ | ✓ | | | | ✓ | |
| A2 | | | ✓ | | | | |
| A3 | | ✓ | | | ✓ | | ✓ |
| A4 | | | | ✓ | | | ✓ |
| A5 | ✓ | | | | ✓ | | |

Fig. 5

|  | Techniques | | | | | | | |
|---|---|---|---|---|---|---|---|---|
|  |  | T1 | T2 | T3 | T4 | T5 | T6 | T7 |
| Techniques | T1 | ▨ | 0.5 | 4.2 | 4.9 | 2.6 | 3.1 | 0.2 |
| | T2 | 0.5 | ▨ | 3.9 | 1.5 | 0.3 | 4.1 | 2.7 |
| | T3 | 4.2 | 3.9 | ▨ | 1.0 | 4.9 | 2.6 | 1.1 |
| | T4 | 4.9 | 1.5 | 1.0 | ▨ | 3.4 | 2.0 | 4.1 |
| | T5 | 2.6 | 0.3 | 4.9 | 3.4 | ▨ | 0.7 | 3.2 |
| | T6 | 3.1 | 4.1 | 2.6 | 2.0 | 0.7 | ▨ | 3.6 |
| | T7 | 0.2 | 2.7 | 1.1 | 4.1 | 3.2 | 3.6 | ▨ |

Fig. 6

| Alert Number | Origin of alert | Technique ID | Host | User | Confidence Score/% |
|---|---|---|---|---|---|
| 1 | Spearfishing attachment | T1566.001 | N/a | 1 | 25 |

| Alert Number | Origin of alert | Technique ID | Host | User | Confidence Score/% |
|---|---|---|---|---|---|
| 1 | Spearfishing attachment | T1566.001 | N/a | 1 | 25 |
| 2 | Windows Cmd Shell | T1059.003 | 1 | 1 | 50 |

| Alert Number | Origin of alert | Technique ID | Host | User | Confidence Score/% |
|---|---|---|---|---|---|
| 1 | Spearfishing attachment | T1566.001 | N/a | 1 | 25 |
| 2 | Windows Cmd Shell | T1059.003 | 1 | 1 | 50 |

| Alert Number | Origin of alert | Technique ID | Host | User | Confidence Score/% |
|---|---|---|---|---|---|
| 1 | Spearfishing attachment | T1566.001 | N/a | 1 | 25 |
| 2 | Windows Cmd Shell | T1059.003 | 1 | 1 | 50 |
| 3 | Data from cloud storage object | T1530 | N/a | 2 | 80 |

| Alert Number | Origin of alert | Technique ID | Host | User | Confidence Score/% |
|---|---|---|---|---|---|
| 1 | Spearfishing attachment | T1566.001 | N/a | 1 | 25 |
| 2 | Windows Cmd Shell | T1059.003 | 1 | 1 | 50 |
| 3 | Data from cloud storage object | T1530 | N/a | 2 | 80 |

| Alert Number | Origin of alert | Technique ID | Host | User | Confidence Score/% |
|---|---|---|---|---|---|
| 1 | Spearfishing attachment | T1566.001 | N/a | 1 | 25 |
| 2 | Windows Cmd Shell | T1059.003 | 1 | 1 | 50 |
| 3 | Data from cloud storage object | T1530 | N/a | 2 | 80 |
| 4 | DLL Side-Loading | T1574.002 | 2 | 2 | 35 |
| 5 | Pass the hash | T1550.002 | Srv1 | 1 | 20 |

| Alert Number | Origin of alert | Technique ID | Host | User | Confidence Score/% |
|---|---|---|---|---|---|
| 1 | Spearfishing attachment | T1566.001 | N/a | 1 | 25 |
| 2 | Windows Cmd Shell | T1059.003 | 1 | 1 | 50 |
| 3 | Data from cloud storage object | T1530 | N/a | 2 | 80 |
| 4 | DLL Side-Loading | T1574.002 | 2 | 2 | 35 |
| 5 | Pass the hash | T1550.002 | Srv1 | 1 | 20 |
| 6 | Cred Dumping LSASS | T1003.001 | Srv2 | 1' | 35 |

| Alert Number | Origin of alert | Technique ID | Host | User | Confidence Score/% |
|---|---|---|---|---|---|
| 1 | Spearfishing attachment | T1566.001 | N/a | 1 | 25 |
| 2 | Windows Cmd Shell | T1059.003 | 1 | 1 | 50 |
| 3 | Data from cloud storage object | T1530 | N/a | 2 | 80 |
| 4 | DLL Side-Loading | T1574.002 | 2 | 2 | 35 |
| 5 | Pass the hash | T1550.002 | Srv1 | 1 | 20 |
| 6 | Cred Dumping LSASS | T1003.001 | Srv2 | 1' | 35 |
| 7 | Valid Accounts | T1566.001 | Srv2 | AppAdm | 60 |

METHODS AND SYSTEMS FOR INDICATING THE POSSIBILITY OF A CYBER-ATTACK ON A COMPUTER NETWORK

FIELD

Embodiments described herein relate to methods and systems for indicating the possibility of a cyber-attack on a computer network.

BACKGROUND

For businesses and individuals alike, the ever growing threats of cyber-attacks, including malware, ransomware, phishing attacks, and data theft, to name but a few, means that network security remains a vital consideration. Not only is it important to have safeguards in place to block such attacks, but identifying events that indicate such an attack is imminent or actually taking place is key to maintaining the integrity of the network.

At present, there exist multiple products that work in detecting and issuing alerts for such events, which might be referred to as "security events". These products include point solution tools, such as Endpoint Detection & Response (EDR) for user devices (laptops, desktops, and tablets, etc.), as well as servers. Other types of product include network security tools that can detect anomalous network traffic, such as sudden spikes in volume that that might be indicative of malicious activity, for example.

One of the challenges faced by any security detection and response team is that of having to identify False Positives i.e. events flagged for response investigation that turn out to be benign activity. The solutions/tools mentioned above can assist to some degree in this area; however, they tend to be less effective in larger, more complex organisations, where the sheer volume of alerts issued makes it difficult to separate false alarms from those events genuinely requiring further investigation.

SUMMARY

According to a first aspect of the present invention, there is provided a computer-implemented method for indicating the possibility of a cyber-attack on a computer network, the method comprising:
  receiving, from one or more security components installed in a network, an indication of activity within the network associated with a security threat;
  mapping the indication of activity to one or more cyber-attack techniques;
  identifying one or more previously received indications of activity within the network associated with a security threat;
  identifying one or more cyber-attack techniques to which the previously received indication(s) of activity have been mapped;
  determining whether the indication of activity is associated with one or more of the previously received indication(s) of activity, wherein the determination is based at least in part on a strength of a relationship between the one or more cyber-attack techniques to which the indication of activity is mapped and the one or more cyber-attack techniques to which the previously received indication(s) of activity have been mapped; and
  dependent on the indication of activity being determined to be associated with a previously received indication of activity, issuing a security alert.

The mapping of each indication of activity to one or more cyber-attack techniques may be based on a reference model, the reference model comprising a list of cyber-attack techniques and examples of activity associated with each technique.

The strength of the relationship between the one or more cyber-attack techniques to which the indication of activity is mapped and the one or more cyber-attack techniques to which the previously received indication(s) of activity are mapped may be determined from histories of previous cyber-attacks.

Determining whether the indication of activity is associated with one or more of the previously received indication(s) of activity may comprise determining whether the strength of the relationship(s) between the one or more cyber-attack techniques to which the indication of activity is mapped and the one or more cyber-attack techniques to which the previously received indication(s) of activity have been mapped is above a threshold.

The method may comprise using a correlation matrix to determine the strength of the relationship(s), the correlation matrix being compiled from the histories of previous cyber-attacks. The correlation matrix may register a correlation between cyber-attack techniques that have previously been observed as occurring in combination as part of a coordinated system of attacks on a network.

Receiving each indication of activity may comprise receiving a set of metadata associated with the respective indication. Determining whether the indication of activity is associated with one or more of the previously received indication(s) of activity may be carried out based at least on the metadata associated with each indication of activity.

Determining whether the indication of activity is associated with one or more of the previously received indication(s) of activity may comprise analysing the metadata associated with each indication of activity to identify one or more attributes that each indication of activity has in common.

Each set of metadata may be formatted to comprise at least one data field that is common to each set of metadata. Determining whether the indication of activity is associated with the previously received indication of activity may comprise comparing each set of metadata to determine whether the two sets share a common entry in the said data field.

The metadata may further include a confidence score for the activity, wherein the confidence score indicates a certainty with which the activity can be attributed to a cyber-attack.

In the event that the indication of activity is determined to be associated with a previous received indication of activity, a combined confidence score may be calculated as a function of the confidence scores associated with the respective indications of activity. The combined confidence score may be computed as a function of the confidence scores associated with the respective indications of activity and the strength of the relationship between the cyber-attack techniques to which the indications of activity are mapped. The security alert may be issued dependent on the combined confidence score being above a threshold.

Each received indication of activity may be recorded as a node in a graph. In the event it is determined that an indication of activity is associated with a previously received indication of activity, an edge may be drawn between the respective nodes in the graph.

The method may further comprise: identifying each group of nodes in the graph that are connected by edges; for each identified group, determining if the combined confidence score for that group of nodes is above the threshold and if so, issuing a security alert.

Each received indication of activity may be stored for a predefined time period, such that associations may be drawn between that received indication of activity and any other indication of activity received during that period.

Issuing a security alert may comprise generating a security ticket for presenting to security personnel.

According to a second aspect of the present invention, there is provided a computer system configured to perform a method according to the first aspect of the present invention.

According to a third aspect of the present invention, there is provided a computer readable storage medium comprising computer executable code that when executed by a computer will cause the computer to carry out a method according to the first aspect of the present invention.

BRIEF DESCRIPTION OF DRAWINGS

Embodiments of the invention will now be described by way of example with reference to the accompanying drawings in which:

FIG. 5 shows an example of how the reference model may be used to identify cyber-attack techniques associated with different alerts, in embodiments described herein;

FIG. 6 shows an example of a correlation matrix for determining whether two cyber-attack techniques are correlated with one another, in accordance with embodiments described herein;

DETAILED DESCRIPTION

Figure 1:
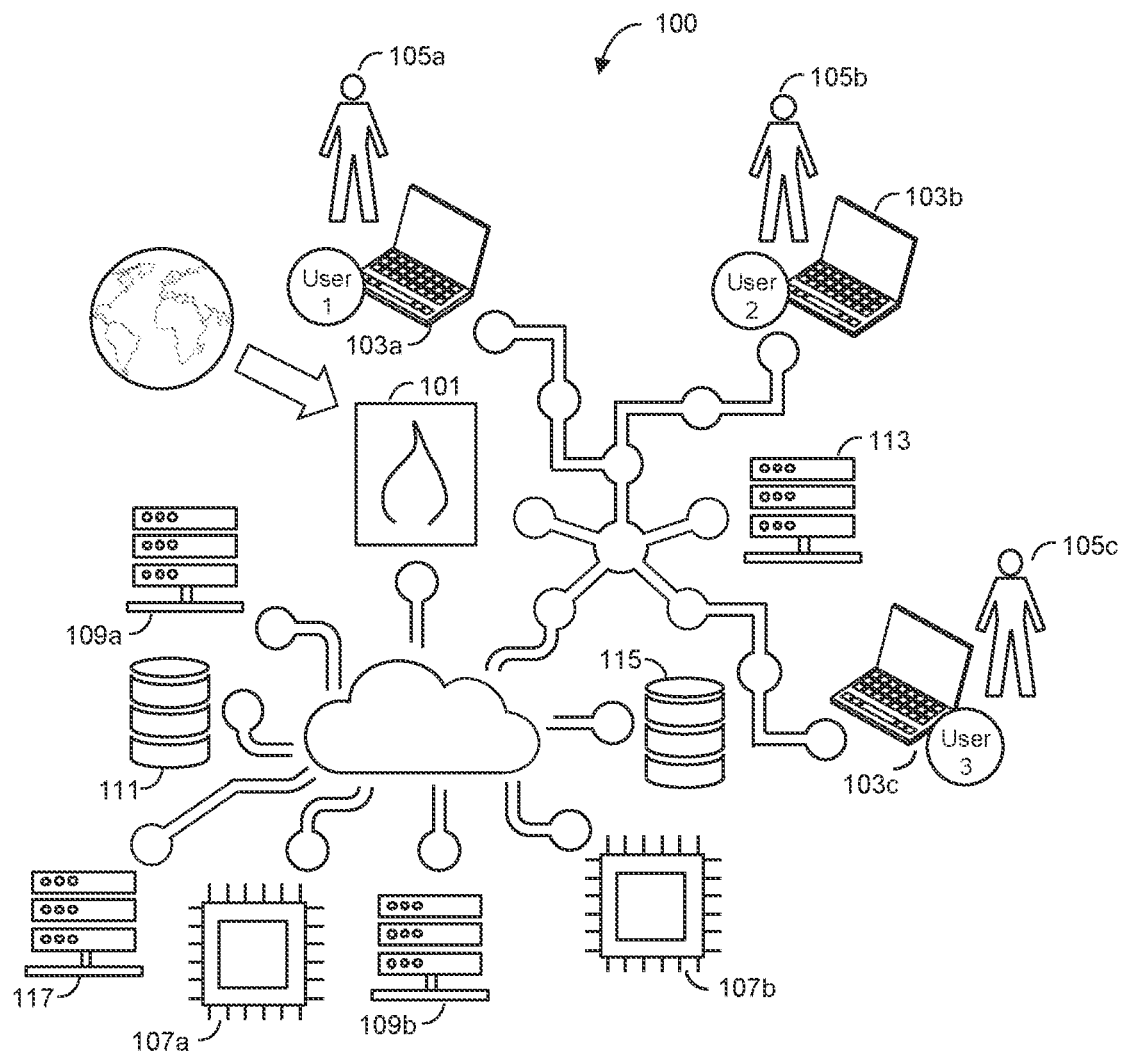
FIG. 1 shows an example network in which embodiments as described herein may be implemented.

FIG. 1 shows an example of network 100 in which a method may be implemented according to embodiments described herein. In this example, the network 100 is a private business network, although it will be appreciated that embodiments are equally applicable to other types of network. The network is protected from the public internet by a firewall 101, which acts to filter incoming and outgoing network traffic based on a set of one or more security policies.

As shown in FIG. 1, the network includes three host devices 103*a*, 103*b*, 103*c*, through which respective users 105*a*, 105*b* and 105*c* may access the network. In the present example, the host devices 103*a*, 103*b*, 103*c* comprise laptop devices, but the host devices may comprise any kind of user terminal device, including a desktop computing device, tablet, or mobile phone, for example. The first user (User 1) 105*a* accesses the network through host device 103*a*, whilst the second user (User 2) 105*b* is able to access the network through host device 103*b*, and the third user (User 3) 105*c* accesses the network through host device 103*c*.

Hosted on the network are applications 107*a*, 107*b*, which are accessible to the users through web browsers installed on the respective host devices. The applications 107*a*, 107*b* may include, for example, a finance system or Human Resources (HR) system.

Also located on the network are two servers 109*a*, 109*b*, a domain controller 111, a Privileged Access management system (PAM) 113, and a datastore 115. The domain controller 111 is used to authenticate and authorizes users and host devices in the network, as well as to assign and enforce security policies across the network. The PAM system 113 acts as a secure repository for privileged users' (administrators) accounts and credentials, reducing the risk of those credentials being stolen by third parties. The datastore 115 serves as a repository of data that users can access by submitting SQL-like queries. In one example, the datastore 115 may contain details of orders placed by customers.

The network 100 may be subject to cyber-attacks from a variety of sources, both internal and external. To help counteract such attacks, various security measures are employed within the network. For example, End Point Detection and Response measures, such as Anti-virus packages, may be installed on devices across the network. The host devices 103a, 103b, 103c may also be provided with instances of IDS (Intrusion detection systems) and/or IPS (Intrusion prevention systems), whilst further instances may be provided throughout the network and/or as part of the firewall 101. Sensors may be placed throughout the network infrastructure to monitor the timing and volume of data packets being sent and to detect anomalous traffic that could be indicative of a security threat. The network may also utilise cloud security tools to check for anomalous interactions between cloud resources.

The security measures described above each generate an output log, recording activity seen across the network. Events considered to be suspicious or requiring further investigation may be accompanied by an alert message, which may be reported to one or more personnel responsible for overseeing the security of the network.

The security measures employed in the network are effective in alerting the security personnel to malicious activity on the network. However, in many cases, the actions that give rise to the alerts are performed for entirely legitimate reasons, as part of the day-to-day functioning of the business. Accordingly, it is not unusual to receive a large number of security alerts that are false positives i.e. alerts for actions that are entirely legitimate. In order to address this problem, the network utilises a Global Correlation Engine (GCE) 117 to identify patterns of behaviour that are more likely indicative of a security threat, and which can reduce the incidence of reporting of false positives. In the example shown in FIG. 1, the GCE engine itself is implemented as software that is run on a dedicated server 117. It will be appreciated, however, that the GCE engine need not require its own dedicated infrastructure and other implementations are possible, whereby the GCE engine may run as an application within an existing SIEM.

Figure 2:
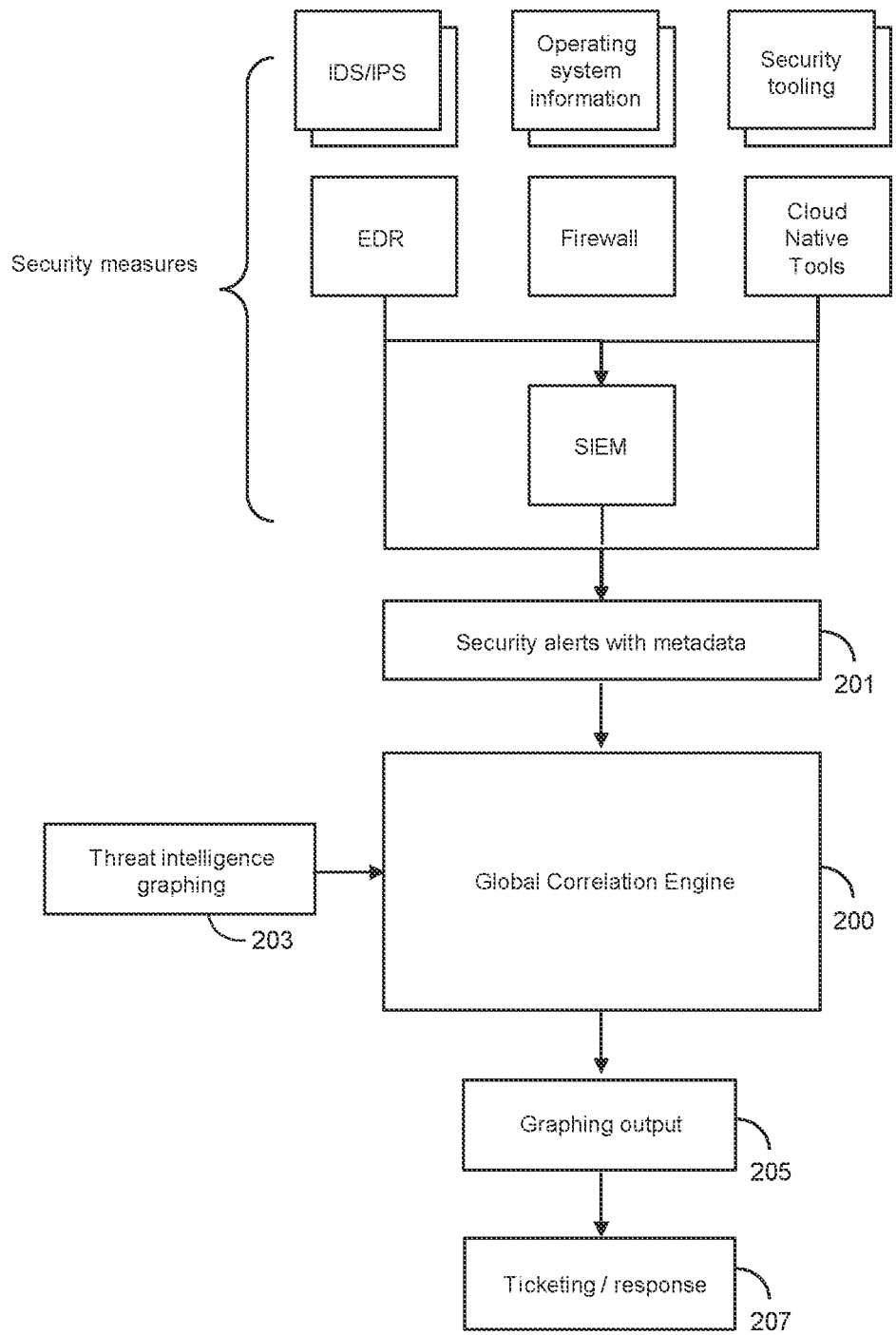
FIG. 2 shows schematically how a Global Correlation Engine GCE as described herein interfaces with security measures in the network of FIG. 1 in order to model patterns of behaviour within the network.

FIG. 2 shows schematically how the GCE 200 interfaces with the security measures described above in order to model patterns of behaviour within the network. The GCE receives security alerts and accompanying metadata 201 from the different security measures, and couples this information with pre-assembled threat intelligence 203 to identify relationships between the alerts that are more likely to signify the actions of a malicious entity or intruder. As will be described further below, the GCE achieves this by constructing a graph output 205 in which alert signals are globally analysed to establish links that suggest related events of interest. The output from the graph is in turn used to identify the presence of security threats with a higher degree of specificity than is available from the security measures alone.

In some instances, as shown in FIG. 2, the security measures may include one or more SIEMs (Security information and event management) systems. The SIEM(s) receive event logs from other ones of the security measures, such as the EDRs, IDS/IPS and use rules to identify events of interest across those different logs in order to detect the presence of a security threat. Where any such event of interest is identified by the SIEM, this may be forwarded as an indication of potential malicious activity to the GCE, either in addition to, or in place of, indications of activity that the GCE receives directly from the other security measures.

The steps carried out by the GCE upon receipt of an alert are discussed in more detail with reference to FIG. 3. In step S301, the GCE receives a security alert output one of the security measures. Each received security alert has a set of associated metadata, indicating an alert name, the point of origin for the alert and the user account and/or host device responsible and IP address, if appropriate. The metadata also includes a confidence score for the alert. The confidence score indicates the certainty with which the alert can be attributed to a cyber-attack, and is itself a product of two scores, namely an "illegitimacy" score and a "precision" score. The illegitimacy score reflects the likelihood that the action to which the alert relates can be attributed to a malicious entity, rather than it being a legitimate action carried out by an authorised entity. The precision score in turn reflects the tolerance for false positives. More specifically, the precision score is a measure of how precisely one can detect only the intended activity that the alert is trying to pick up on, rather than another activity. For example, if seeking to detect a particular tool used by a malicious entity, it may be possible to detect the use of that tool by knowing that the tool exhibits certain behaviours. However, the same behaviours may also be observed by other applications that have similar characteristics; this will mean that detection of those behaviours does not guarantee an attack by a malicious entity.

As an example of how the illegitimacy score and precision score may be combined, an Anti-Virus program may identify a particular file as having a hash value that is highly indicative of malware. The ensuing alert will have both a high score for illegitimacy and a high score for precision, because such a signature would only ever be caused by malware and so must be indicative of an attack by a malicious entity. Conversely, an action such as emptying the recycle bin on a person's desktop may be awarded a low score for illegitimacy on the basis that the action of emptying the recycle is a routine action, but may still be awarded a high score for precision on the basis that this action can easily be distinguished from other actions carried out on the network.

Figure 4:
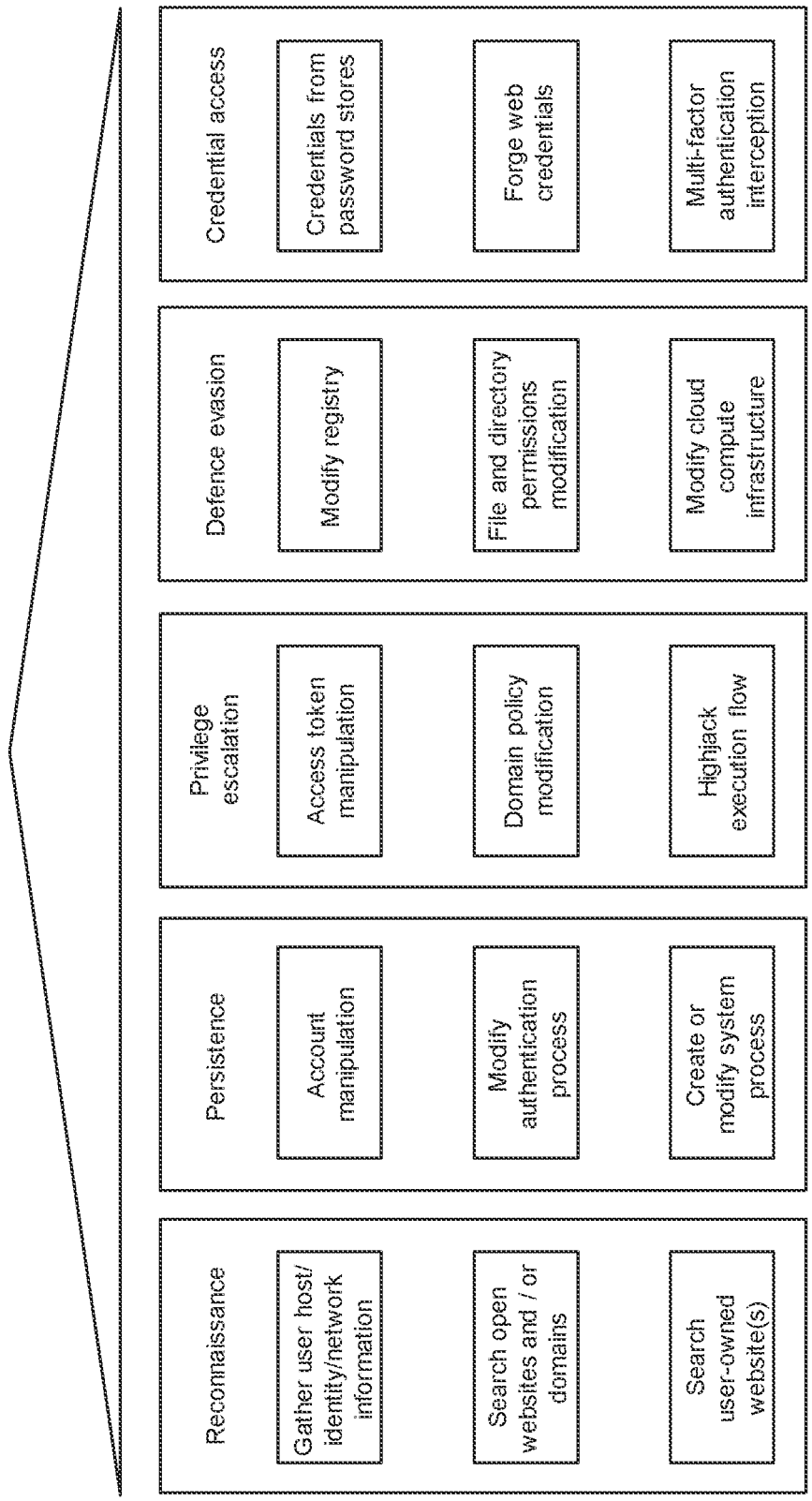
FIG. 4 shows an example structure for a reference model as used in embodiments described herein.

In step S302, the received alert signal is mapped to one or more cyber adversary techniques using a reference model. FIG. 4 shows an example of such a reference model, which is based on the Mitre Att&ck Framework. Using this model, the received alerts can be classed within one or more tactics categories, including "Reconnaissance", "Persistence", "Privilege Escalation", "Defence Evasion" and "Credential Access". Each one of the categories includes a list of techniques, to which the alert signal may be mapped. An alert signal that is classified within the "Persistence" category, for example, may be mapped to the technique of "Account manipulation", or "Modify authentication process", whilst another alert that is classified as relating to "Defence Evasion" may be mapped to the technique of "Modify Registry" or "File and directory permissions modification". FIG. 5 shows pictorially how, by using the mappings provided by the reference model, different techniques can be identified as relevant to each one of a series of alerts A1 to A5.

It will be appreciated that the list of techniques shown in FIG. 4 is provided by way of example, and that in practice, the array of tactics and techniques may be considerably larger than that shown. The reference model may be continuously updated by the security community, so that as new connections are identified between particular alerts and different cyber-attack techniques, these associations are introduced into the model and future alerts are mapped accordingly.

Returning again to FIG. 3, in step S303, the metadata associated with the alert is used to add a node on a graph. The graph can be used to map the relationship(s) that exist between the alert and other alert(s) that have previously been received from one or other of the security measures. Having added the node to the graph, the GCE now seeks to identify other nodes in the graph that share a relationship with that node. The GCE does so first by identifying existing nodes whose associated techniques—as determined from the reference model—are correlated with/share a relationship with that of newly added node (step S304). In order to determine if two nodes meet this criteria, the GCE may consult a correlation matrix, such as the one shown in FIG. 6.

The correlation matrix provides an indication of the prevalence with which different techniques are used in combination with each other, as part of a larger sequence of actions aimed at targeting a network. As an example, a first technique and a second technique may be deemed to occur in combination with high prevalence if it is observed that a high proportion of malicious actors, when using the first of these two techniques, also use the second technique as part of their overall strategy to attack the network. In another example, two techniques may be deemed to occur in combination with high prevalence if it is observed that a high proportion of cyber-attacks that utilise the first technique also utilise the second technique (in contrast to the first example, this second metric allows for the fact that a large number of cyber-attacks may be instigated by a very small number of entities, or even a single entity only).

Techniques that have a high prevalence of occurring in combination with one another will have a higher score in the correlation matrix, representing a stronger relationship between those techniques. As an example, taking technique T1 of FIG. 6 to represent the use of phishing emails and technique T4 of FIG. 6 to represent "file execution", it can be seen from the score of 4.9 in the correlation matrix that these two techniques share a strong relationship with one another. Conversely, if we now consider that technique T7 of FIG. 6 represents "network sniffing", it can be seen from the score of 0.2 that "phishing emails" and "network sniffing" share a much weaker relationship than "phishing emails" and "file execution".

The correlation matrix may be generated offline by a threat intelligence platform (TIP), in which information from prior attacks is stored in a repository and analysed to build up a knowledge base of technique prevalence in attacks (i.e. observed Tactics, Techniques & Procedures TTP). In some cases, the GCE may dynamically mine the information stored in the repository to determine the likelihood that two techniques will be observed in combination with one another.

In some embodiments, a threshold may be applied to the correlation matrix, whereby only those pairs of techniques having a relationship of a certain strength are deemed to be related to one another, whilst those pairs of techniques for which the value in the correlation matrix falls below the threshold are deemed as not being related to one another. As example, if the threshold were to be set at 3.0, technique T1 would be seen to share a relationship with techniques T3, T4 and T6, whilst techniques T2, T5 and T7 would be deemed as not sharing a relationship with technique T1.

In some embodiments, the correlation matrix of FIG. 6 may be binary i.e. with pairs of techniques being assigned a "1" or "0" only, indicating that each respective pair of techniques either has a relationship, or does not.

Referring back to FIG. 3 once more, in step S305, having identified one or more nodes whose associated techniques share a relationship with that of the newly added node, the GCE now determines whether the metadata of those nodes can be used to trace one or more common attributes of the alerts represented by those nodes. For example, the GCE determines whether the alerts originate from the same user account, host device, IP address etc., or if the information contained in any of the other fields of metadata is a match. Where such a match is found, an edge is drawn in the graph between the two nodes, connecting the different alerts together in the graph (step S306). In the event no such match is found, the method returns to step S301.

In order to assist the GCE in determining whether a connection exists between different alerts, the metadata associated with each alert may undergo a process of normalisation, either prior to its being received by the GCE, or once it has been input but prior to step S305 being carried out. In this process, the metadata associated with each alert is updated to conform to the same format, having the same set of fields that can be read and recognised by the GCE. By doing so, the GCE can be presented with a consistent input from all channels, regardless of which one of the security measures the original alert originated from.

In some embodiments, the metadata may undergo a separate process of enrichment, whereby one or more elements of the metadata are abstracted back to a particular entity, device, web domain, or other attribute. For example, the metadata associated with an alert may include the email address of a particular user. The GCE may determine by interrogating a registry of user information that the user email address is associated with a particular individual. The individual's name may then be added to the metadata as a new field. Enrichment may enable connections to be identified between alerts that might otherwise go undetected. In some embodiments, for example, the metadata associated with two particular nodes may not, prima facie, have any attributes in common; that is, each field of the metadata associated with one alert may contain different data from that contained in the metadata associated with another alert. However, the GCE may still be able to draw a link between those nodes by abstracting the different elements of metadata back to a common entity, device, web domain, or other attribute. Taking the example above, the metadata associated with an alert received from a first one of the security measures may include the email address of a particular user, whilst the metadata associated with an alert received from another security measure may include a user login for a particular application. Whilst the user login and email address will themselves comprise different strings of data, the GCE may determine by interrogating the registry of user information that the user email address and the user login are both associated with the same individual, and as such a connection exists between those alerts. In such a case, a new field containing this data (in this example, the individual's name) may be added to each set of metadata, as part of the process of normalising the metadata.

Having undergone enrichment and/or normalisation, the metadata may include the original metadata, together with the confidence score, and following step S302 may be further updated to include any technique(s) to which the alert has been mapped in the reference model.

Where a connection is drawn between two nodes in step S306, the confidence scores associated with the alert(s) in question are now processed to determine a combined confidence score (step S307). The combined confidence score may be obtained as a function of the individual scores for each one of the connected nodes.

In practice, a number of different functions may be used to obtain the combined confidence score for a set of nodes in the graph. In one embodiment, the combined confidence score may be obtained as the sum of the individual scores for each one of the connected nodes. In another embodiment, the function used may be one that affords a greater weight to certain nodes, based on the type of alert that they represent and/or the point of origin of those alerts.

In some embodiments, the function used to obtain the combined confidence score for a group of connected nodes may not only take into account the individual scores for those connected nodes, but also the strength of the relationship between the cyber-attack techniques to which the respective alerts are mapped. For example, the function used to compute the combined confidence score may include as one of its parameters the values shown in the correlation matrix for the edges between each one of the connected nodes. Where there is seen to be a stronger relationship between those techniques—for example, as is the case for techniques T1 and T4 of FIG. 6—this may contribute to an increase in the combined confidence score for the set of nodes in question. In contrast, where there is a much weaker relationship between the techniques—for example, as is the case for techniques T1 and T7 of FIG. 6—this may place a limit on the combined confidence score for the set of nodes (this is assuming, of course, that techniques T1 and T7 are deemed to share a relationship at all; in the event that a threshold is applied to the values in the correlation matrix, and the value in the correlation matrix for techniques T1 and T7 falls below that threshold, the nodes whose alerts are mapped to techniques T1 and T7 would not be connected in the graph to begin with).

Figure 3:
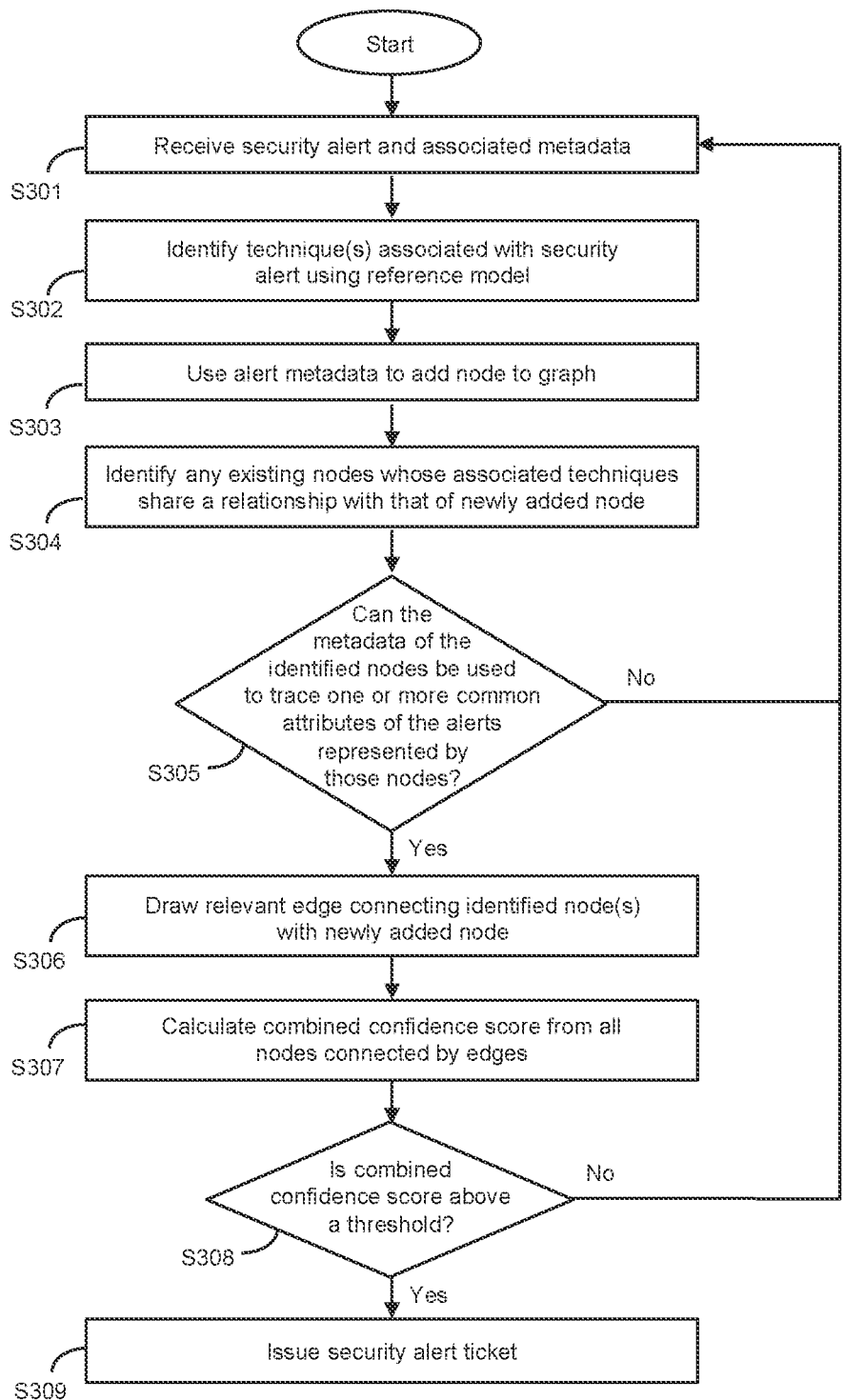
FIG. 3 shows a flow-chart of steps carried out by the GCE according to an embodiment.

Turning to step S308 of FIG. 3, a determination is made as to whether or not the combined confidence score is above a given threshold. In the event the score is above the threshold, the method proceeds to step S309, in which a new security alert ticket is issued by the GCE. If the combined confidence score remains below the threshold, meanwhile, the method returns to step S301.

It will be appreciated that different thresholds may be applied for the combined confidence score, depending on the context. For example, different thresholds may be applied for different response activities or based on the 'asset' class/criticality itself. i.e. lower tolerance on high value assets. In some cases, certain types of alert (e.g. a ransomware alert issued by one of the security measures) may elicit the generation of a security ticket by the GCE, regardless of any association or connection to other previously received alerts; this may be achieved by including a rule that a particular type of alert should require the generation of a security ticket in all circumstances, or by ensuring that the confidence score associated with that type of alert is set high enough as to meet the threshold for generating a security ticket, regardless of whether it is linked to any other nodes in the graph.

In summary, the GCE can be seen to be overlaid on top of other security solutions that are present in the network and use global analysis to dynamically find 'sequences' (stages of an attack/connected activity) of attack activity through correlations other systems can't visualise. Using the reference model, together with threat intelligence, the GCE is able to dynamically find related activity, rather than being 'taught' particular attack paths or scenarios to look for. Use of such a global framework allows an entirely fresh approach to tackling detection, by abstracting some of the complexities and detail unnecessary to support the understanding of behaviours present in attacks. The engine can also blend together cyber behaviours with non-cyber activities such as traditional insider threats and other potential applications such as fraud and e-crime.

Correlation efficacy is independent of the complexity of the underlying environments and identifies high fidelity sequences of potential attacks/breaches for incident response teams to investigate.

Figure 7:
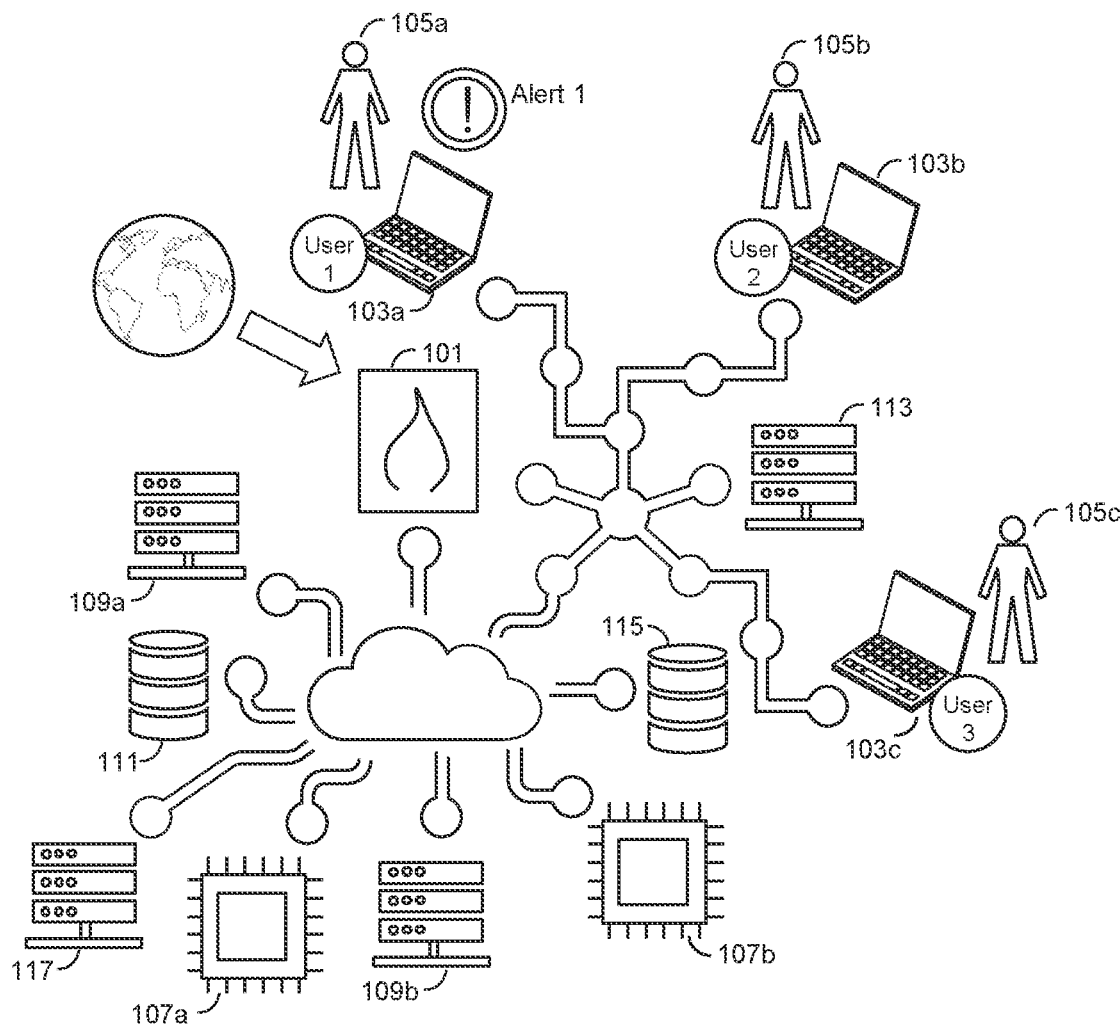
FIG. 7 shows the network of FIG. 1 at a first point in time at which a first security alert is raised by activity taking place in the network.

An example of how the GCE functions will now be described with reference to FIGS. 7 to 23. FIG. 7 shows the network of FIG. 1 at a first time point, at which an external inbound email is received by User 1 105a. The email, which prima facie originates from a trustworthy source, invites the user to visit a particular website by clicking on a link contained within the body of the message. At this stage, it is not known where the link is genuine, or instead a link to a site containing malware or other threat to network security. A spear phishing alert is created as Alert 1, and a standard security alert ticket generated, which is stored in table 201. The alert includes an ID in the form of an alert number, and a description/type for the alert ("Spearfishing attachment"). Using the reference model, the alert is mapped to a particular attack technique, with the technique ID being recorded as part of the metadata for the alert. The metadata also includes details of the host (in this case, N/A) and the relevant user (User 1), as well as the confidence score for the alert. In this case, the user ID is obtained by resolving the user's email address to their actual user account in a process of orchestration.

Figure 8:
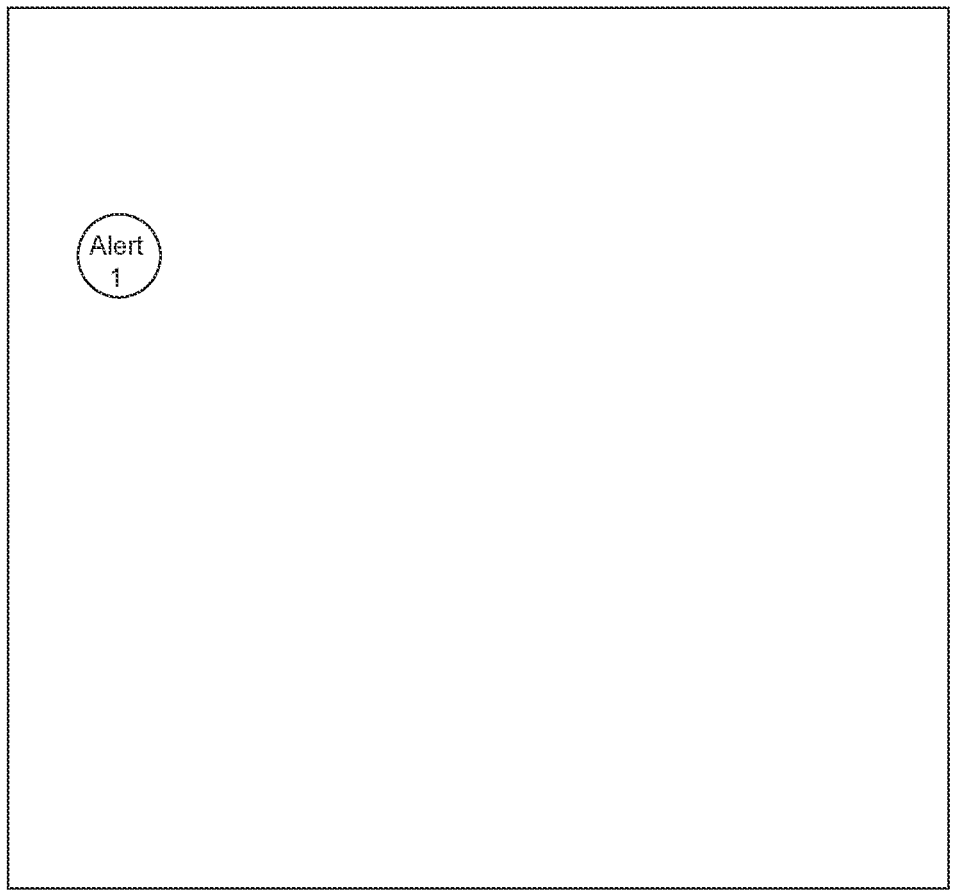
FIG. 8 shows an example of a graph drawn by the GCE as a means for logging security alerts and establishing connections between the alerts, in accordance with embodiments described herein.
Figure 8:
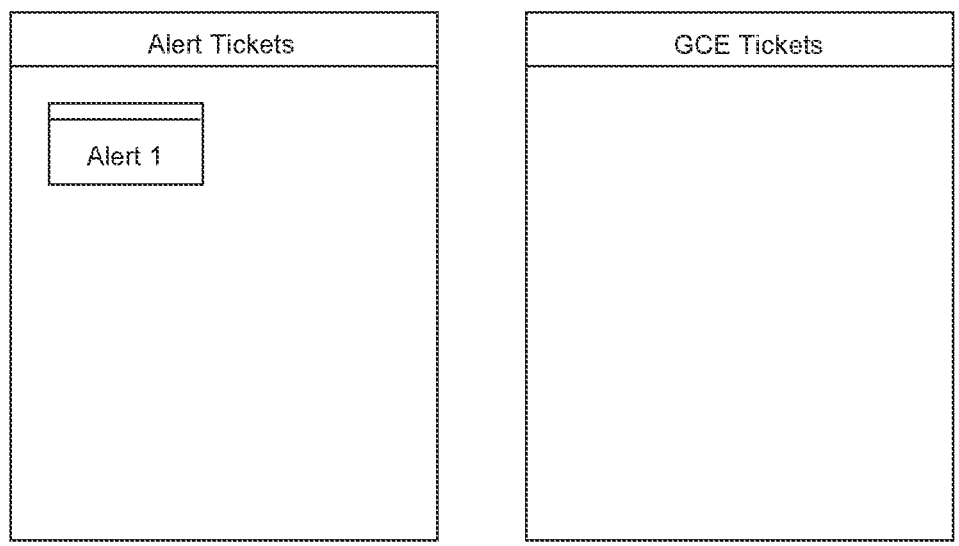

FIG. 8 shows a graph output by the GCE following receipt of alert 1. A single node is added to the graph, indicating that an alert has been received. The original ticket for the alert is also shown. At this point, the GCE has not itself generated any tickets since the presence of a single alert is not of itself sufficient to result in one being produced by the GCE.

Figure 9:
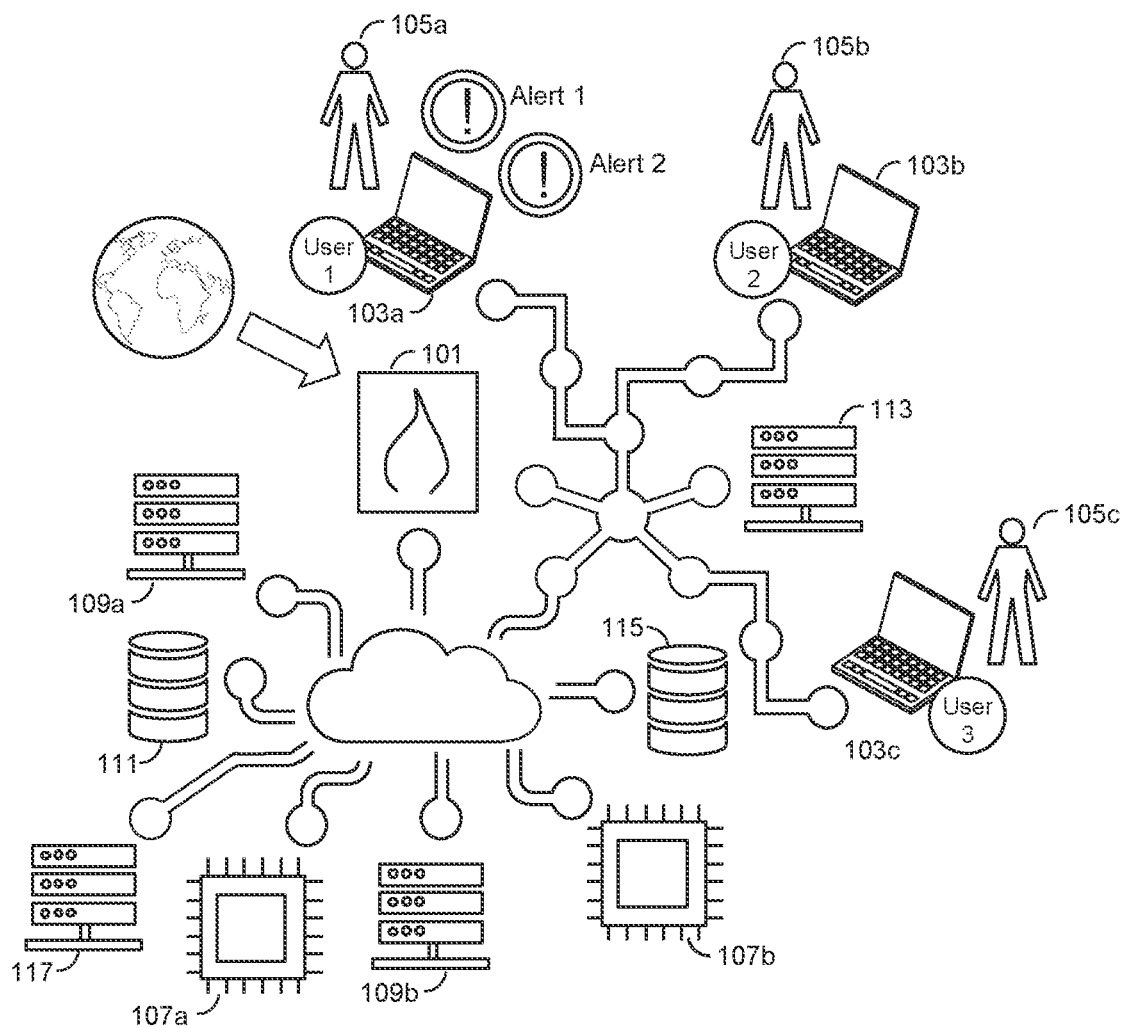
FIG. 9 shows the network of FIG. 7 at a later point in time at which a second security alert is raised by activity taking place in the network.
Figure 10:
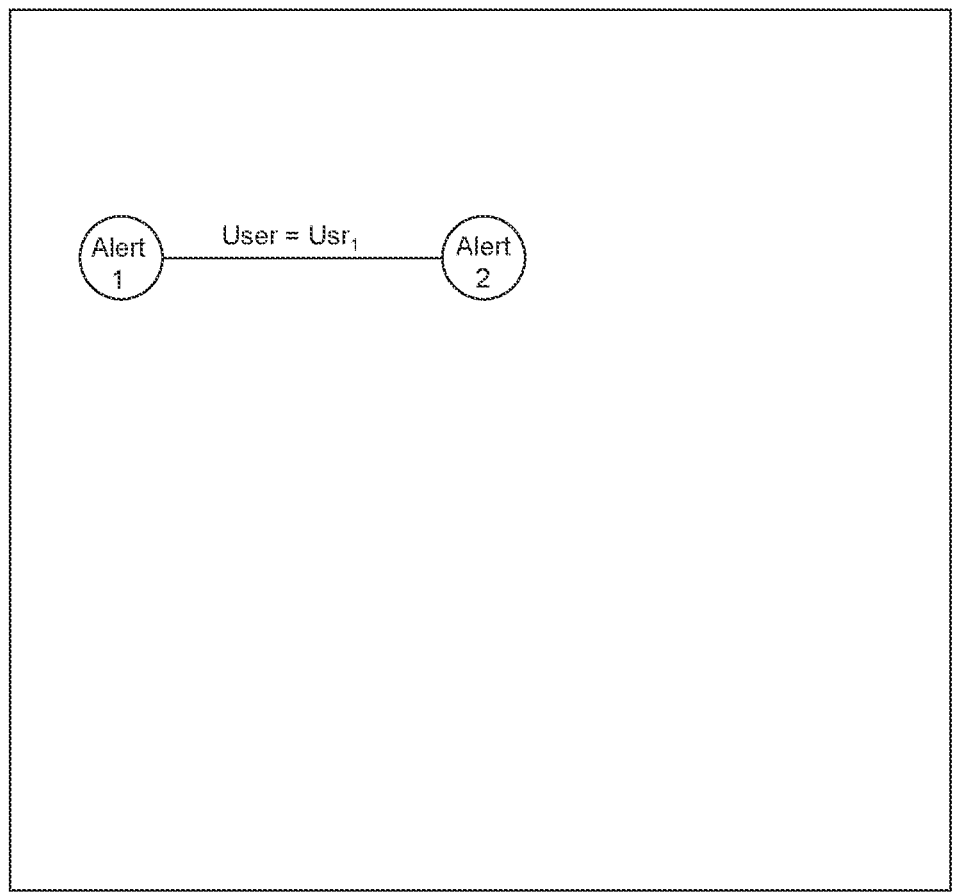
FIG. 10 shows the graph of FIG. 8 having been updated to register the second security alert.
Figure 10:
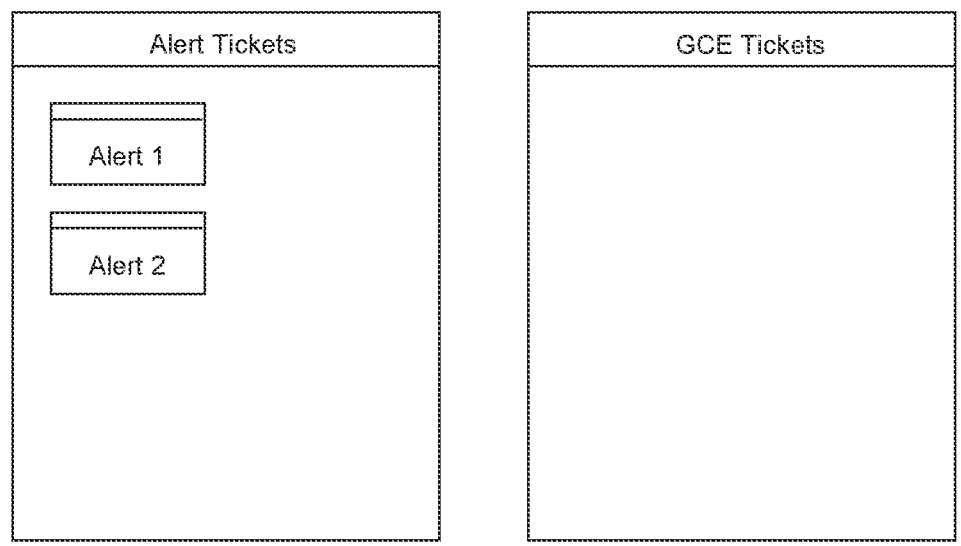

FIG. 9 shows the state of the network at a later point in time, at which a suspicious command shell is run on host device 103a, to which user1 105a is logged in. This action generates a second security ticket as Alert 2. Again, the metadata is collated and stored and a new node added to the graph (see FIG. 10). As with Alert 1, this second alert is mapped to one or more techniques using the reference model and the relevant technique ID stored as part of the metadata for the alert. Using the correlation matrix, the GCE is able to determine that the respective techniques associated with Alert 1 and Alert 2 share a relationship of a certain strength with one another. Moreover, since the two alerts share the same user information (User 1), a connection is established between those alerts, which is visualised by drawing an edge between the two alerts in the graph of FIG. 10. Although there is a connection, the GCE has still yet to generate a ticket, since the combined confidence score for Alert 1 and Alert 2 (which in this example is provided by the sum of those scores) is still below the necessary threshold.

Figure 11:
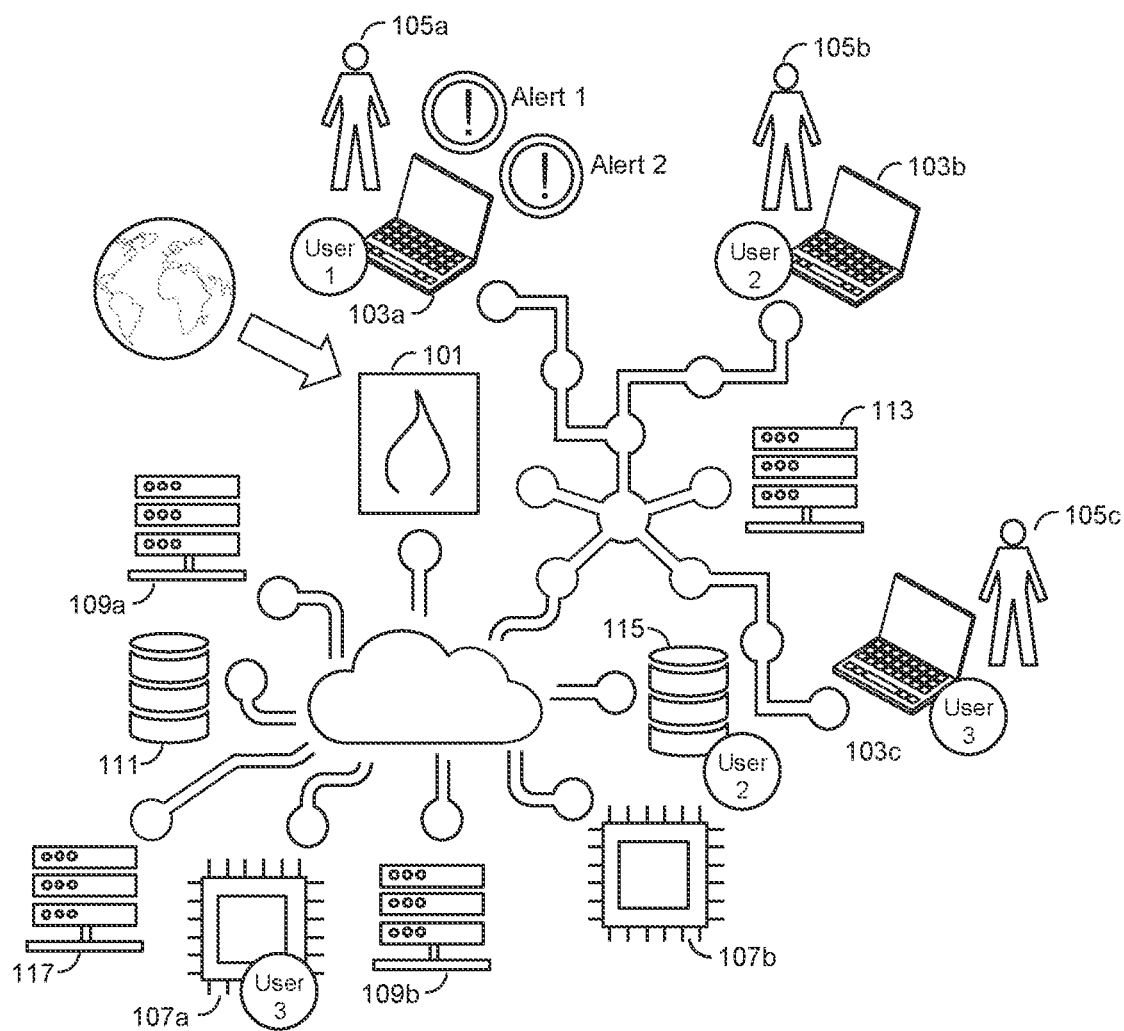
FIG. 11 shows the network of FIG. 9 at a later point in time.

Turning to FIG. 11, at a still later point in time, User 3 105c successfully authenticates to application 107a, allowing them to access the application. User 2 105b meanwhile attempts to authenticate to the cloud database 115 and is also successful in doing so. Since these actions are considered to be entirely legitimate, no further security alerts are issued at this time and the graph output by the GCE remains unchanged.

Figure 12:
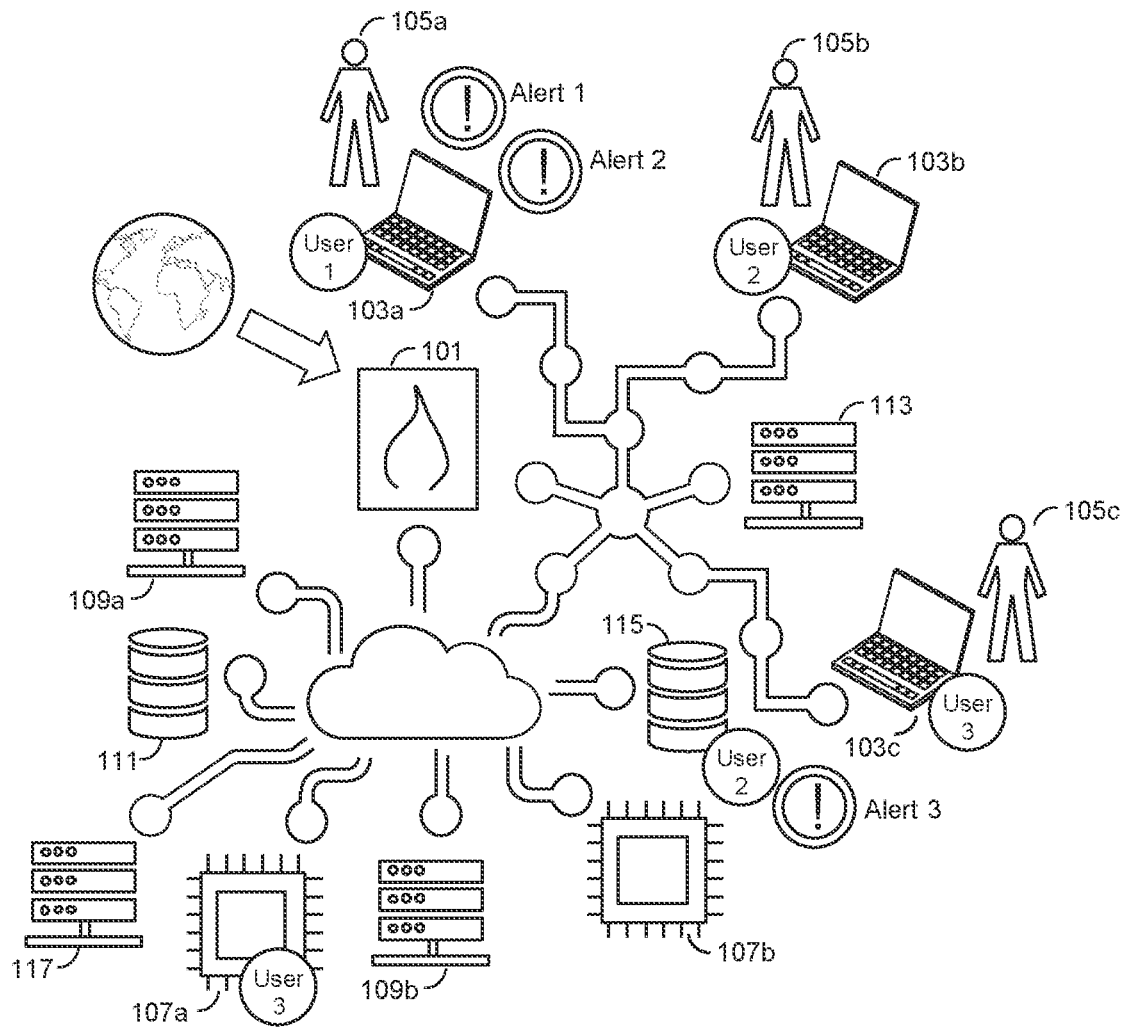
FIG. 12 shows the network of FIG. 11 at a later point in time at which a third security alert is raised by activity taking place in the network.
Figure 13:
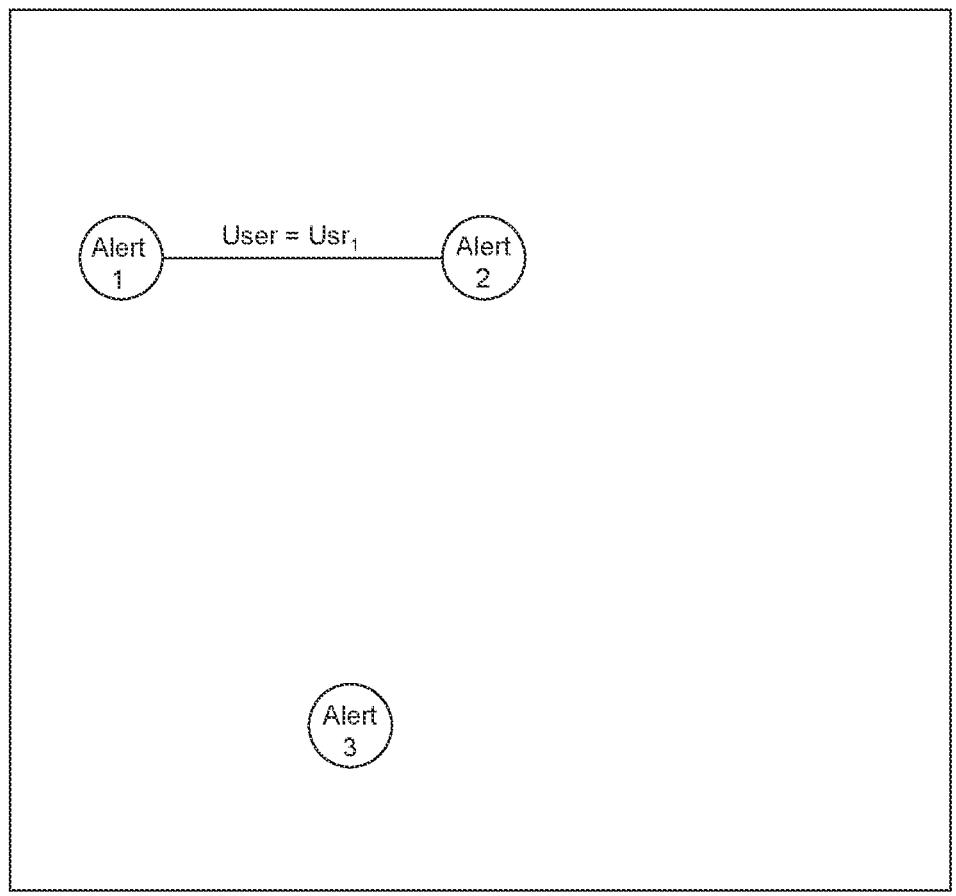
FIG. 13 shows the graph of FIG. 10 having been updated to register the third security alert.
Figure 13:
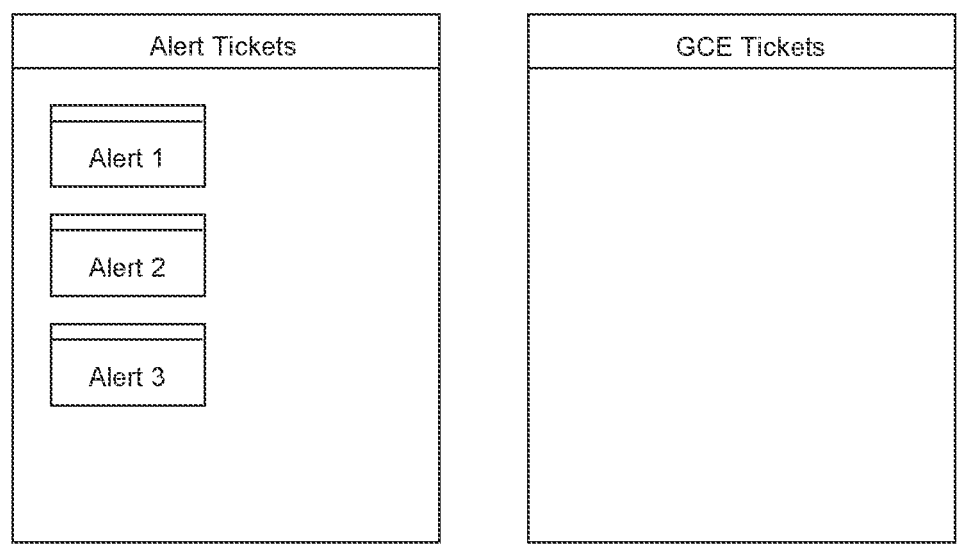

FIG. 12 shows the state of the network at a fourth point in time. Here, database activity by User 2 105b indicates that a large extract of customer data has been carried out at table level. This gives rise to a third security alert, Alert 3, which is duly added as a node on the graph (see FIG. 13). Since Alert 3 does not include any entries in its metadata that are common to Alert 1 or Alert 2, there is no connection formed between Alert and those earlier alerts in the graph.

Figure 14:
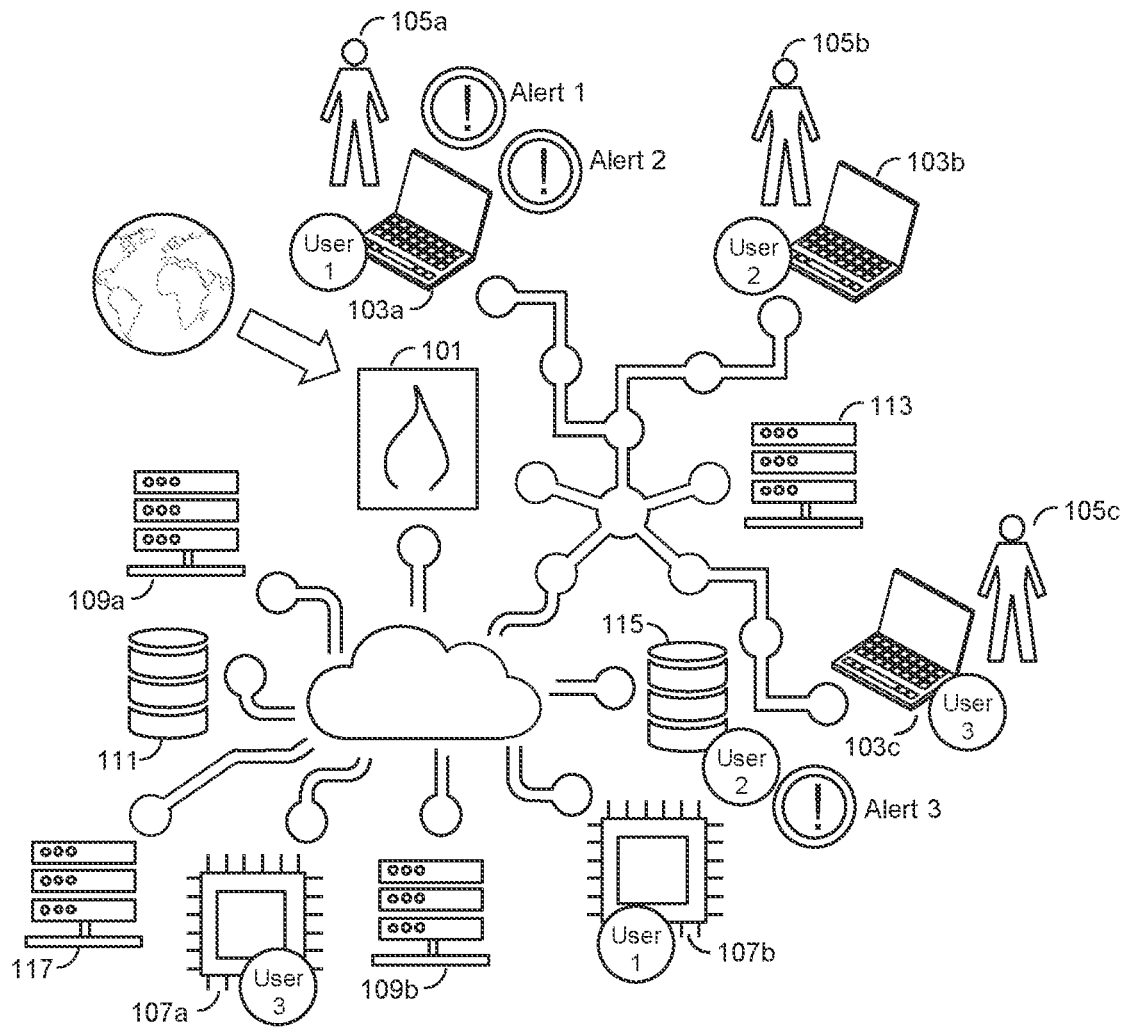
FIG. 14 shows the network of FIG. 12 at a later point in time.

Referring now to FIG. 14, this shows the network at a fifth point in time, at which User1 successfully attempts to authenticate to application 107b. Again, since this action is considered to be entirely legitimate, no further security alert is issued at this time and the graph output by the GCE remains unchanged.

Figure 15:
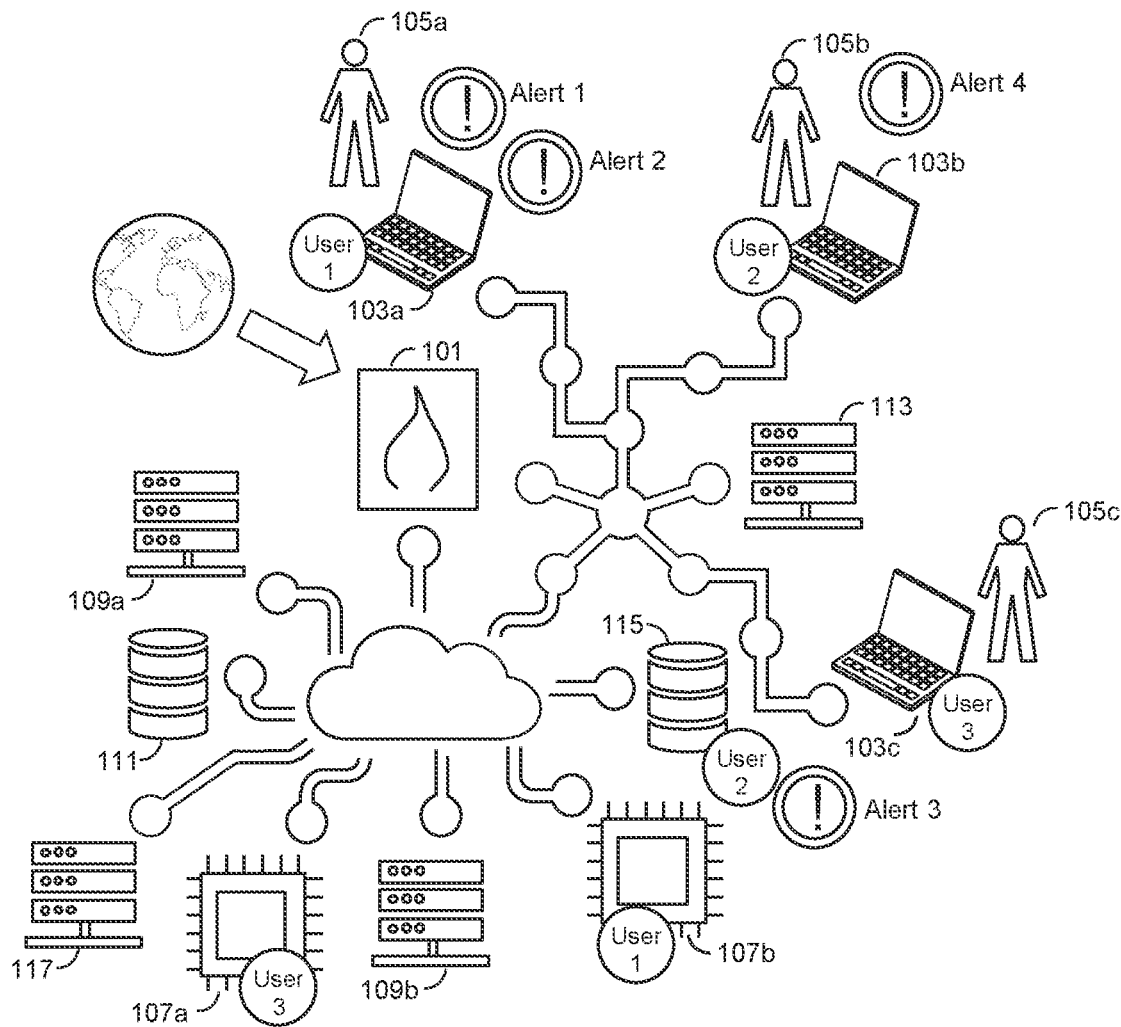
FIG. 15 shows the network of FIG. 14 at a later point in time at which a fourth security alert is raised by activity taking place in the network.
Figure 16:
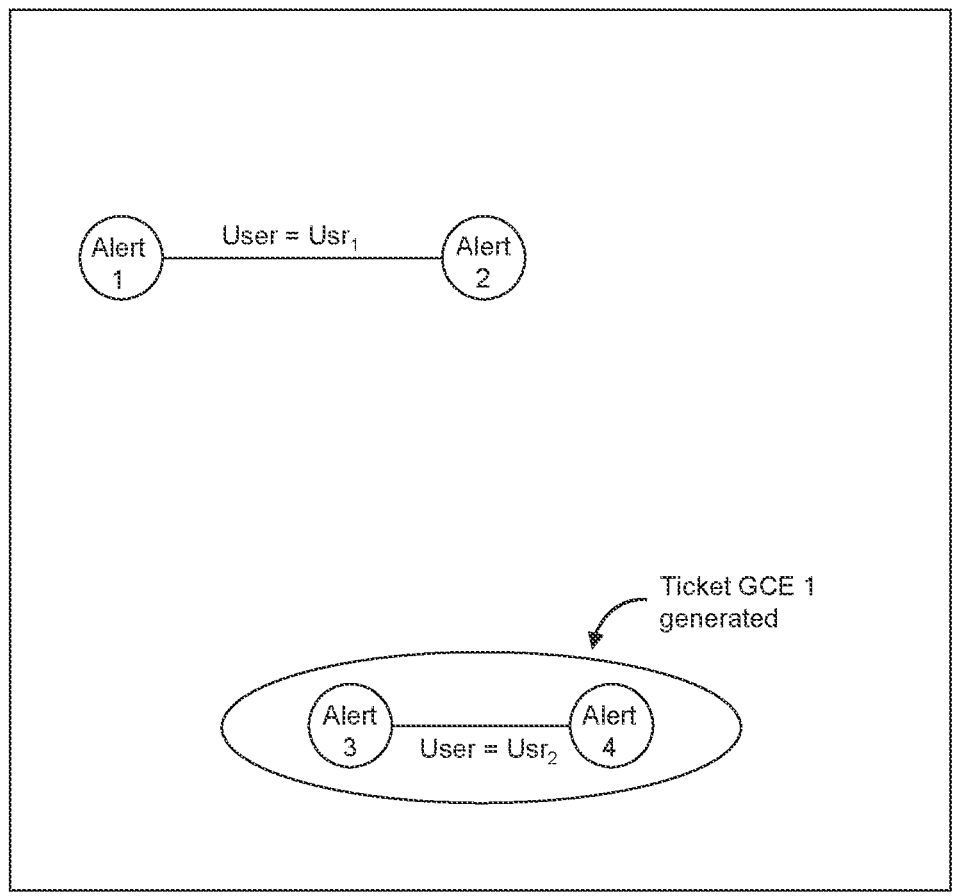
FIG. 16 shows the graph of FIG. 13 having been updated to register the fourth security alert.
Figure 16:
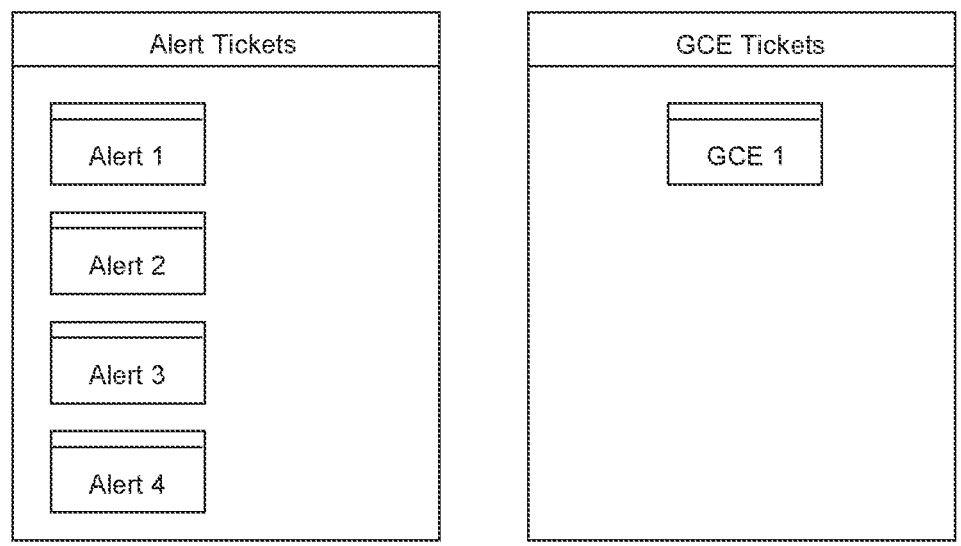

FIG. 15 shows the state of the network at a still later point in time. Here, anomalous client activity is detected on host device 103b. The activity is identified as comprising a DLL hijacking attempt, resulting in issue of a new security alert, Alert 4. Alert 4 is determined to correlate with Alert 3, since both are associated with User 2 and have been mapped to cyber-attack techniques that are also deemed to share a relationship of a certain strength with one another based on the threat intelligence. Following this, as shown in FIG. 16, a node is drawn on the graph for Alert 4 and connected by an edge to Alert 3. Since the combined confidence score for the pair of connected alerts Alert 3 and Alert 4 exceeds the required threshold (in this case, 100%) a new ticket is cut by the GCE, indicating that a security attack has been detected.

Figure 17:
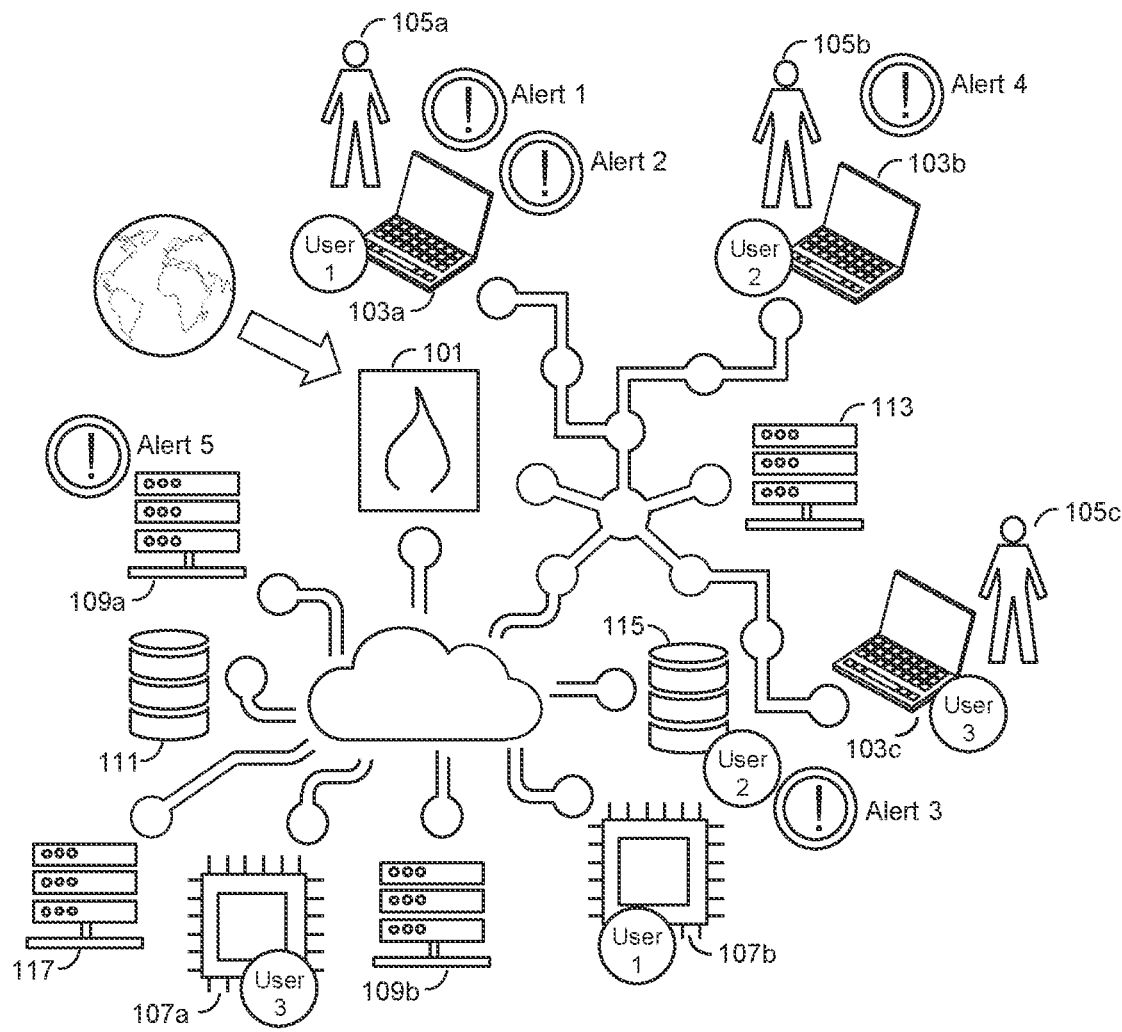
FIG. 17 shows the network of FIG. 15 at a later point in time at which a fifth security alert is raised by activity taking place in the network.
Figure 18:
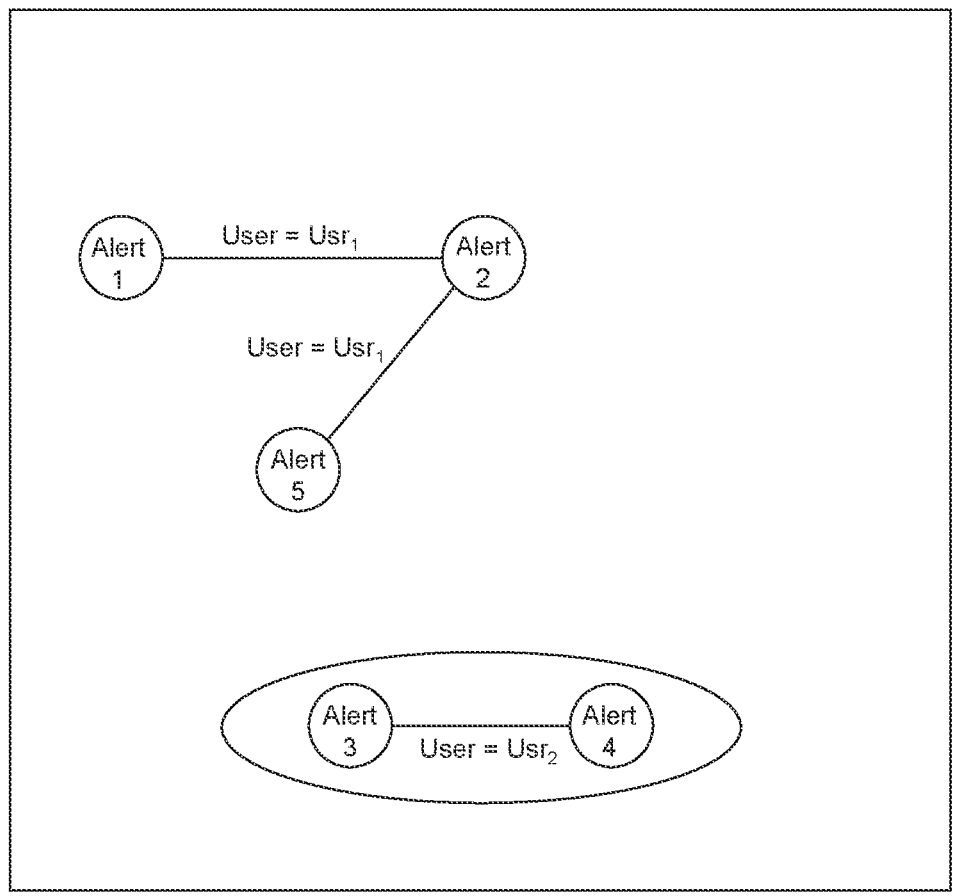
FIG. 18 shows the graph of FIG. 16 having been updated to register the fifth security alert.
Figure 18:
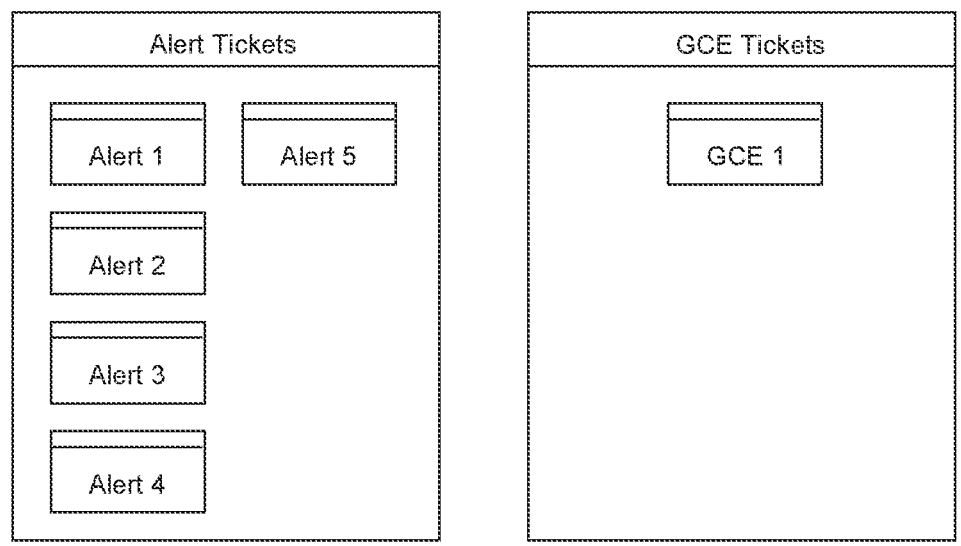

Turning to FIG. 17, at a still later time point, an attacker tries to use stolen credential User 1 to attempt to logon to the server 109a but is detected. A new alert is issued as Alert 5. Alert 5 is determined as being correlated with Alert 2 on the basis that both Alerts pertain to the same user account (User 1) and are mapped to respective techniques that share a relationship of a certain strength with each other. Following this, a new node is added on the graph in FIG. 18, with an edge drawn between Alert 2 and Alert 5. The graph now includes a sequence of three nodes (Alert 1, Alert 2 and Alert 5) that are joined by edges; however, at this stage the GCE does not generate a new ticket because the combined confidence score for those three nodes is still below the required threshold.

Figure 19:
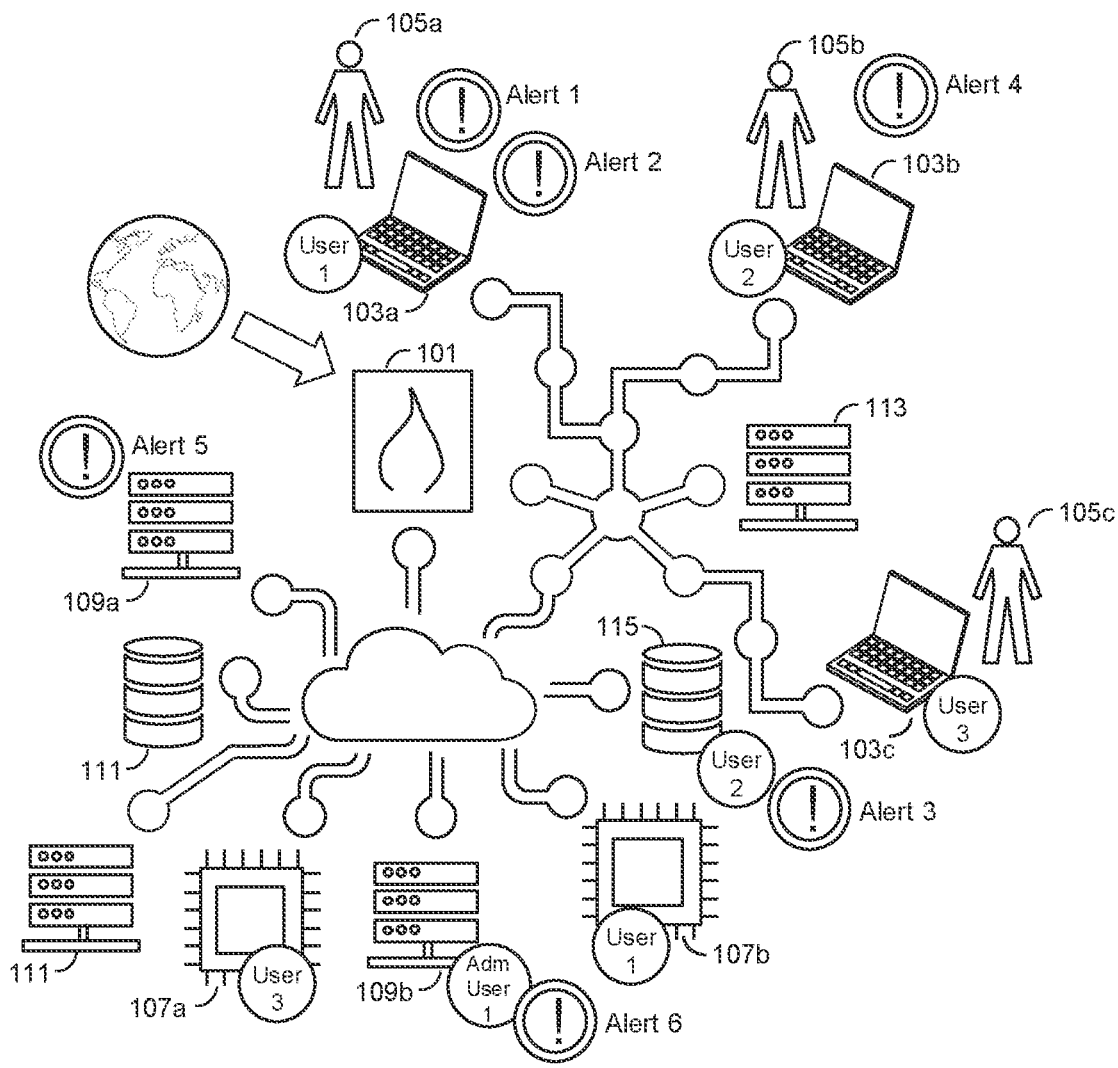
FIG. 19 shows the network of FIG. 17 at a later point in time at which a sixth security alert is raised by activity taking place in the network.
Figure 20:
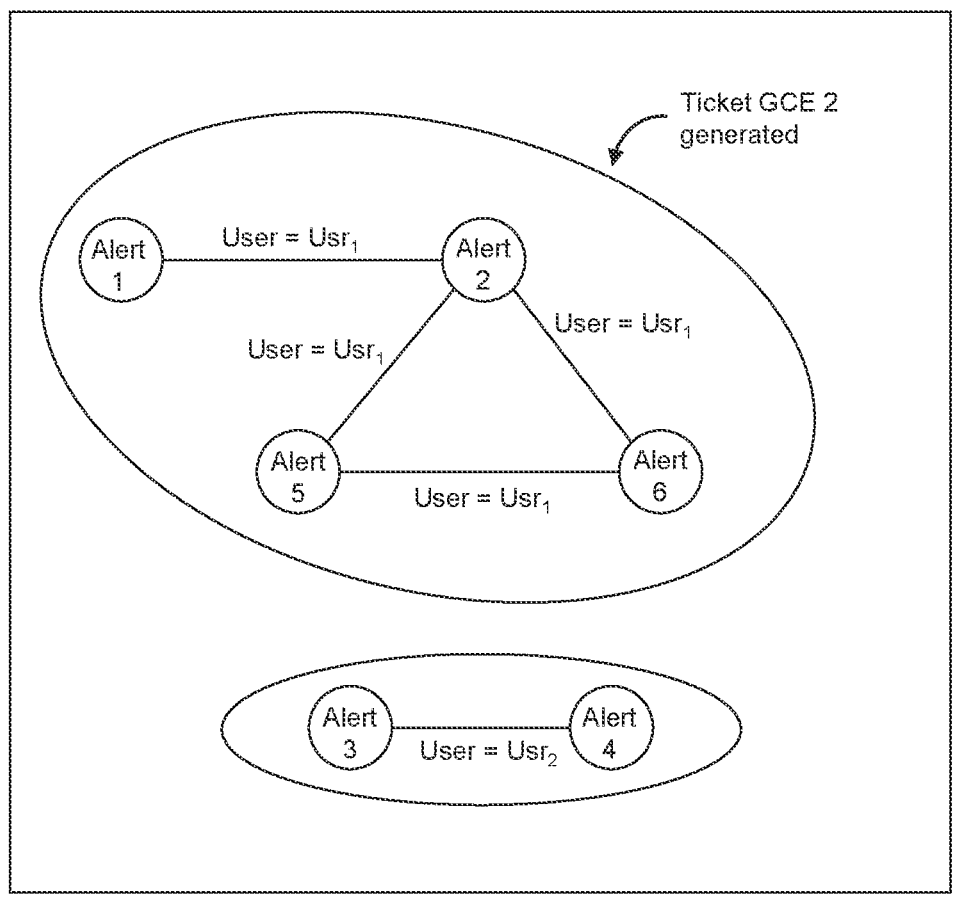
FIG. 20 shows the graph of FIG. 18 having been updated to register the sixth security alert.
Figure 20:
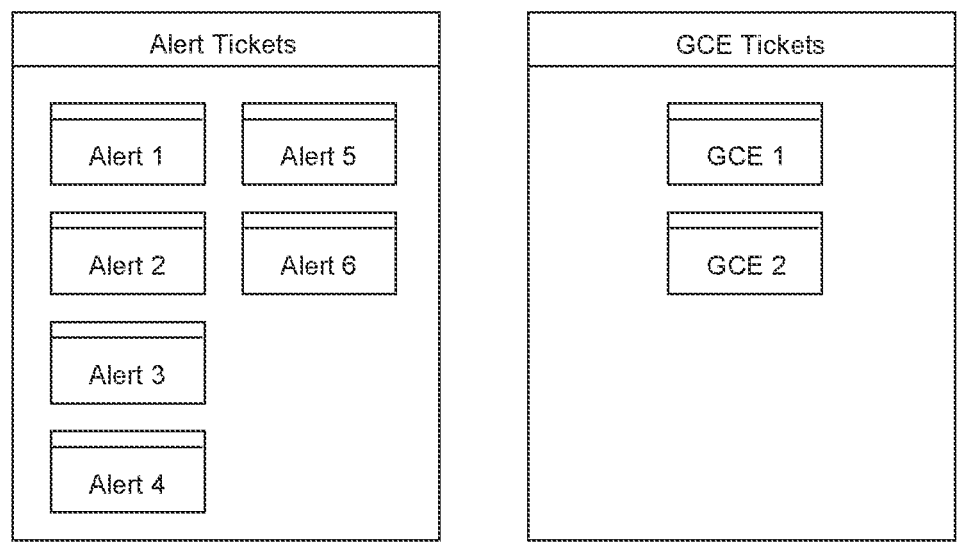

FIG. 19 shows the state of the network at a yet further point in time, at which the attacker has cracked User 1's personal administrative account password i.e. AdmUsr1. (Note AdmUsr1 is resolved via lookup to belong to User 1 by orchestration.) and authenticated to server 109b. The attacker now tries to capture all the locally held credentials (i.e. credentials from previous logins to server 109b) from server 109b. The attacker's actions are captured as an LSASS (Local Security Authority Subsystem Service) Credential Dumping alert as Alert 6 on the server 109b (Srv2). Alert 6 is correlated with both Alert 2 and Alert 5, with edges being drawn in the graph between each one of these three nodes (see FIG. 20). At this point, the nodes for Alert 1, Alert 2, Alert 5 and Alert 6 form a collection of nodes connected to one another by edges in the graph, with a combined confidence score that exceeds the threshold. As a result, the GCE now generates a second security ticket.

Figure 21:
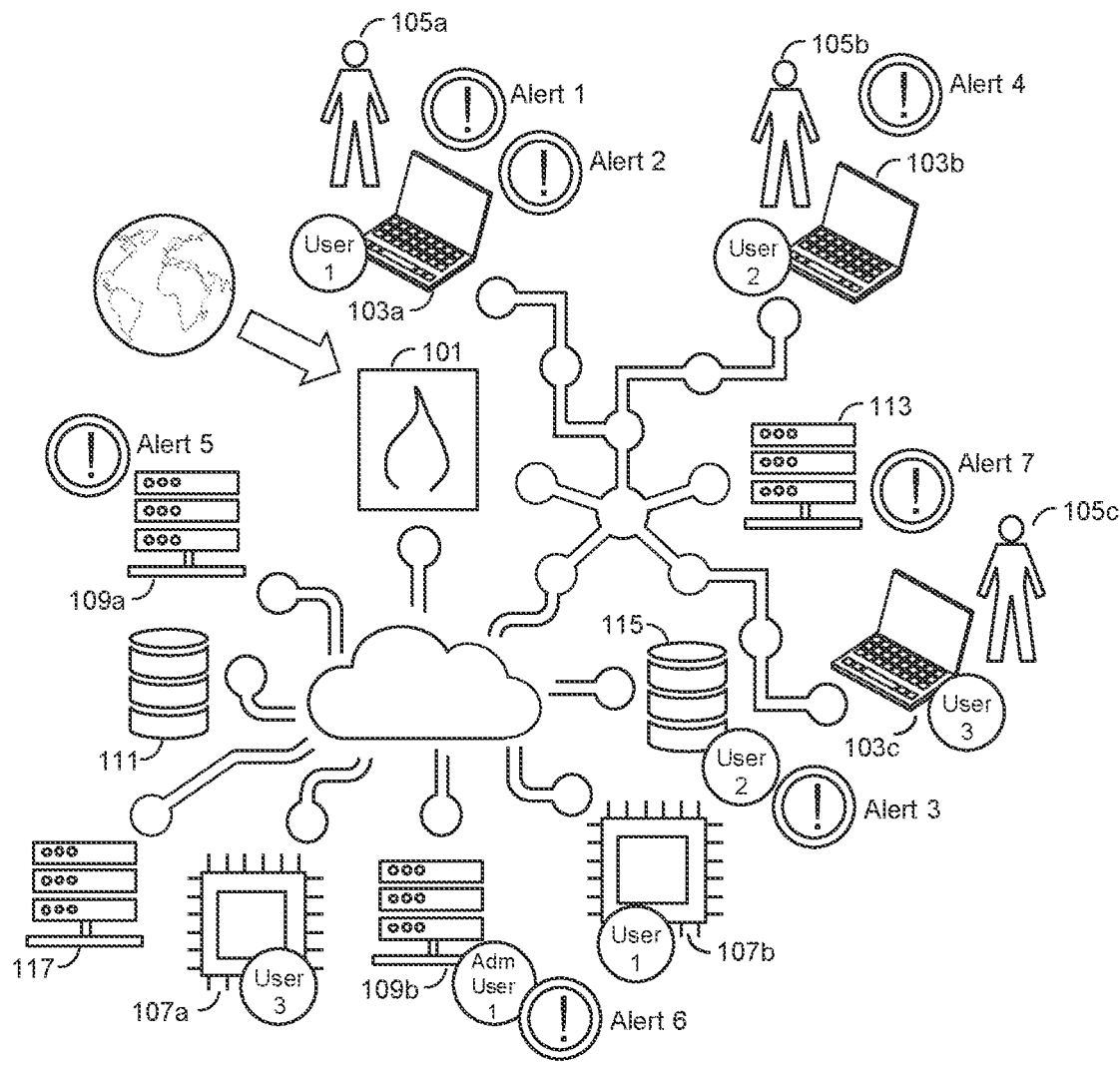
FIG. 21 shows the network of FIG. 19 at a later point in time at which a seventh security alert is raised by activity taking place in the network.
Figure 22:
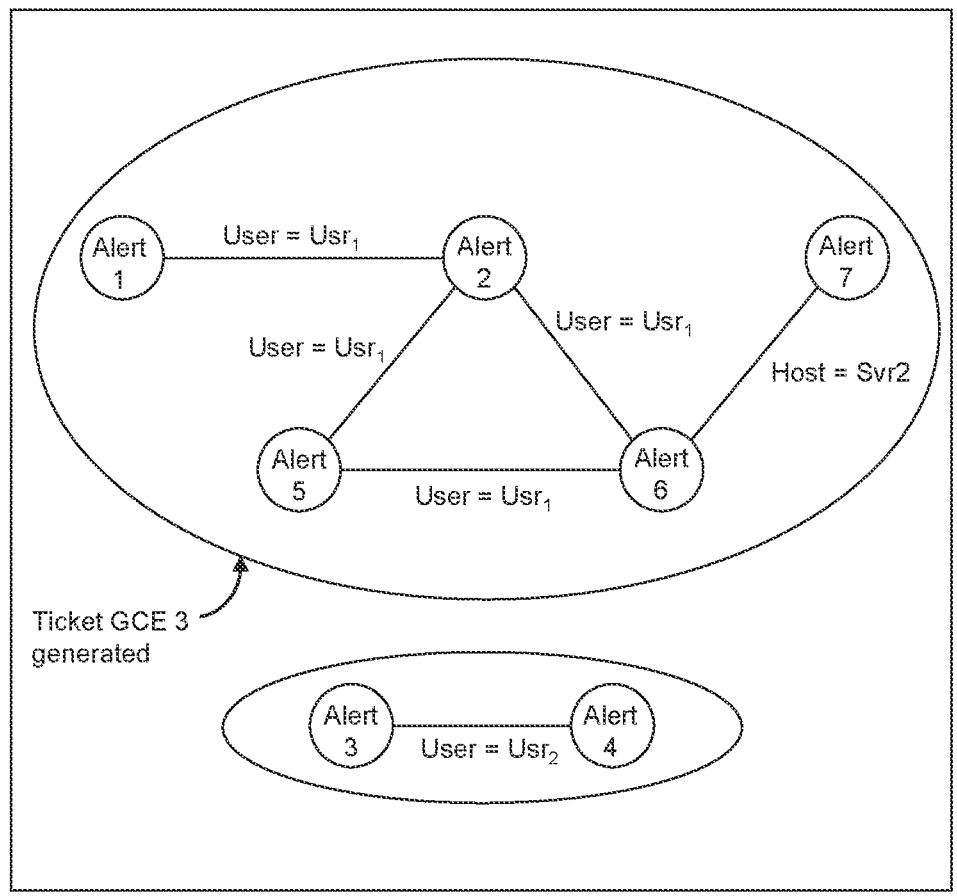
FIG. 22 shows the graph of FIG. 20 having been updated to register the seventh security alert.
Figure 22:
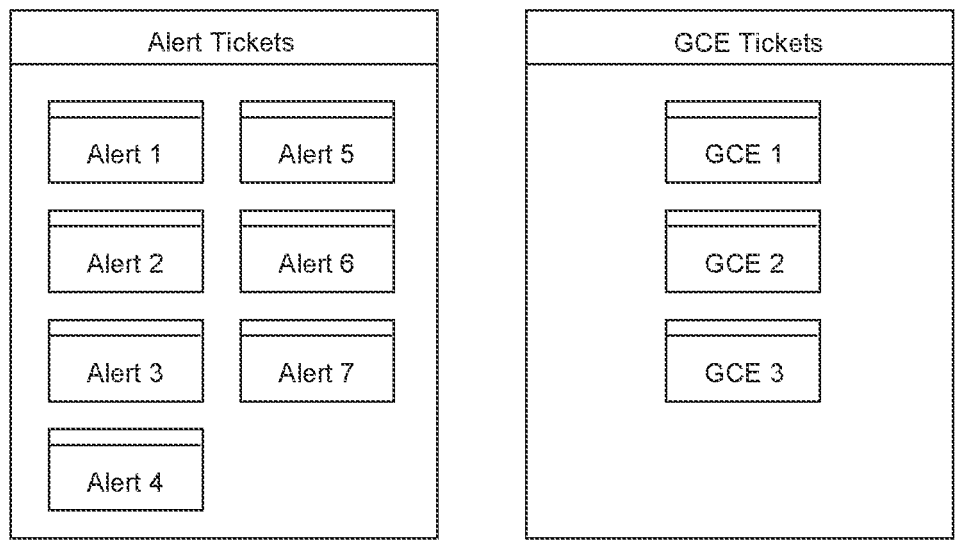

Referring now to FIG. 21, using the credentials dumped from server 109b (Srv2), the attacker proceeds to try to use the system account AppAdm for application 107a, but there is no corresponding (expected) PAM checkout. As a result of this, a new Alert 7 is generated. Alert 7 is mapped to a technique in the reference model that shares a relationship of a certain strength with the technique to which Alert 6 was previously mapped. Alert 6 and Alert 7 are also deemed to be correlated by virtue of their being associated with the same host Srv2 (note, this contrasts with the other nodes in the graph, where the connection is based on a common user account, rather than host). As shown in FIG. 22, a new node is added to the graph for Alert 7, with an edge connecting Alert 6 and Alert 7. The newly extended sequence of connected nodes now has a further increased combined confidence score, resulting in the generation of a third security ticket by the GCE.

Once generated, the graph may be output as a graph file in JSON format, containing a full graph of all observed sequences.

In some embodiments, automated responses may be triggered once a combined confidence score surpasses an additional thresholds. For example, where a combined confidence score exceeds 100%, a ticket may be generated by the GCE, whilst a sequence of connected nodes having a combined confidence score of 200% may invoke automatic lockdown or forensic capture of an endpoint. Additional safeguards may be put in place to ensure that sequences of connected nodes do not get too large (i.e. creation of superclusters) by using graphing functions alongside the core GCE algorithm.

It will further be recognised that sophisticated cyber-attacks can take place over extended timeframes, dependent on the interval between initial access and the establishment of persistence. Further steps, such as moving laterally or exfiltration of information, can in some cases take weeks if not months from when initial access was obtained. The GCE can correlate alerts that happen over these extended periods of time by storing and analysing up to T days' of alerts, where T may be hundreds of days. Alerts that have been present in the graph for >T days may be removed together with their connecting edges, so as to avoid exceeding memory storage limits.

Figure 23:
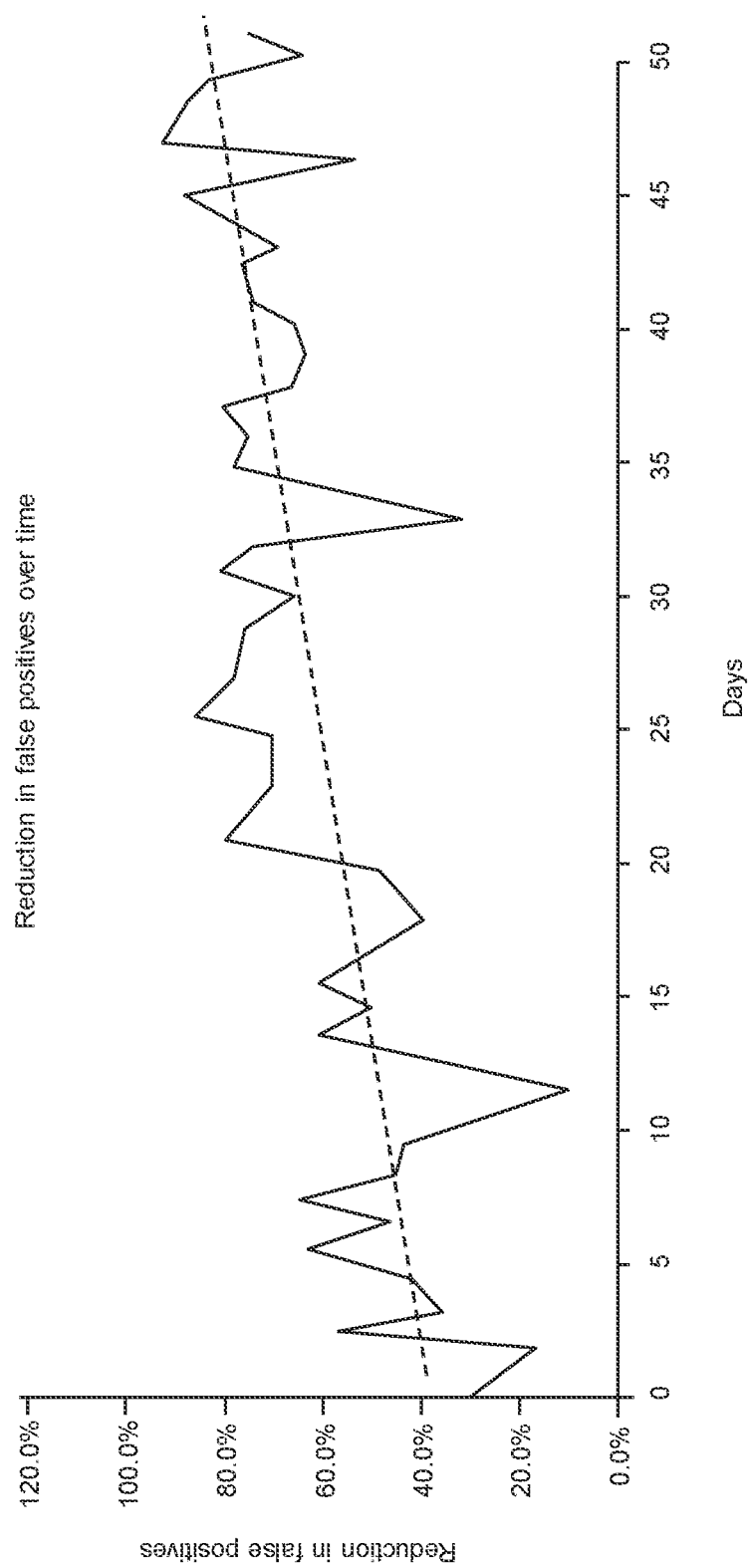
FIG. 23 shows experimental data indicating a reduction in false positives when implementing a GCE according to an embodiment.

The efficacy of the GCE engine can be appreciated by reference to FIG. 23, which shows results of implementing an embodiment of the GCE in a live system. In this case, over the course of two and half months testing, a consistent reduction of 70%-92% was seen in the number of false positives in security alerts referred to security personnel.

Implementations of the subject matter and the operations described in this specification can be realized in digital electronic circuitry, or in computer software, firmware, or hardware, including the structures disclosed in this specification and their structural equivalents, or in combinations of one or more of them. Implementations of the subject matter described in this specification can be realized using one or more computer programs, i.e., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

While certain embodiments have been described, these embodiments have been presented by way of example only and are not intended to limit the scope of the invention. Indeed, the novel methods, devices and systems described herein may be embodied in a variety of forms; furthermore, various omissions, substitutions and changes in the form of the methods and systems described herein may be made without departing from the spirit of the invention. The accompanying claims and their equivalents are intended to cover such forms or modifications as would fall within the scope and spirit of the invention.

The invention claimed is:

1. A computer-implemented method for indicating the possibility of a cyber-attack on a computer network, the method comprising:
   receiving, from one or more security components installed in a network, an indication of activity within the network associated with a security threat, each indication of activity comprising a set of metadata associated with the respective indication;
   mapping the indication of activity to one or more cyber-attack techniques;
   identifying one or more previously received indications of activity within the network associated with a security threat;
   identifying one or more cyber-attack techniques to which the previously received indication(s) of activity have been mapped;
   determining whether the indication of activity is associated with one or more of the previously received indication(s) of activity, wherein determining whether the indication of activity is associated with one or more of the previously received indication(s) of activity is carried out based at least on the metadata associated with each indication of activity, wherein the determination is based at least in part on a strength of a relationship between the one or more cyber-attack techniques to which the indication of activity is mapped and the one or more cyber-attack techniques to which the previously received indication(s) of activity have been mapped; and
   dependent on the indication of activity being determined to be associated with a previously received indication of activity, issuing a security alert.

2. The computer-implemented method of claim 1, wherein the mapping of each indication of activity to one or more cyber-attack techniques is based on a reference model, the reference model comprising a list of cyber-attack techniques and one or more activities associated with each technique.

3. The computer-implemented method of claim 1, wherein the strength of the relationship between the one or more cyber-attack techniques to which the indication of activity is mapped and the one or more cyber-attack techniques to which the previously received indication(s) of activity are mapped is determined from histories of previous cyber-attacks.

4. The computer-implemented method of claim 1, wherein determining whether the indication of activity is associated with one or more of the previously received indication(s) of activity comprises determining whether the strength of the relationship(s) between the one or more cyber-attack techniques to which the indication of activity is mapped and the one or more cyber-attack techniques to which the previously received indication(s) of activity have been mapped is above a threshold.

5. The computer-implemented method of claim 3, comprising using a correlation matrix to determine the strength of the relationship(s), the correlation matrix being compiled from the histories of previous cyber-attacks.

6. The computer-implemented method of claim 5, wherein the correlation matrix registers a correlation between cyber-attack techniques that have previously been observed as occurring in combination as part of a coordinated system of attacks on a network.

7. The computer-implemented method of claim 1, wherein determining whether the indication of activity is associated with one or more of the previously received indication(s) of activity comprises analysing the metadata associated with each indication of activity to identify one or more attributes that each indication of activity has in common.

8. The computer-implemented method of claim 7, wherein each set of metadata is formatted to comprise at least one data field that is common to each set of metadata; and
   determining whether the indication of activity is associated with the previously received indication of activity comprises comparing each set of metadata to determine whether the two sets share a common entry in the said data field.

9. The computer-implemented method of claim 1, wherein the metadata further includes a confidence score for the activity, wherein the confidence score indicates a certainty with which the activity can be attributed to a cyber-attack.

10. The computer-implemented method of claim 9, wherein in the event that the indication of activity is determined to be associated with a previous received indication of activity, a combined confidence score is calculated as a function of the confidence scores associated with the respective indications of activity.

11. The computer-implemented method of claim 10, wherein the combined confidence score is computed as a function of the confidence scores associated with the respective indications of activity and the strength of the relationship between the cyber-attack techniques to which the indications of activity are mapped.

12. The computer-implemented method of according to claim 11, wherein the security alert is issued dependent on the combined confidence score being above a threshold.

13. The computer-implemented method of claim 1, wherein each received indication of activity is recorded as a node in a graph,
   wherein in the event it is determined that an indication of activity is associated with a previously received indication of activity, an edge is drawn between the respective nodes in the graph.

14. The computer-implemented method of claim 13, further comprising:
   identifying each group of nodes in the graph that are connected by edges;
   for each identified group, determining if the combined confidence score for that group of nodes is above the threshold and if so, issuing a security alert.

15. The computer-implemented method of claim 1, wherein each received indication of activity is stored for a predefined time period, such that associations may be drawn between that received indication of activity and any other indication of activity received during that period.

16. The computer-implemented method of claim 1, wherein issuing a security alert comprises generating a security ticket for presenting to security personnel.

17. A computer system configured to perform the method of to claim 1.

18. A non-transitory computer readable storage medium comprising computer executable code that when executed by a computer will cause the computer to carry out the method of claim 1.

* * * * *